US006961253B1

(12) United States Patent
Cohen

(10) Patent No.: US 6,961,253 B1
(45) Date of Patent: Nov. 1, 2005

(54) DRIVE CIRCUITS FOR SYNCHRONOUS RECTIFIERS

(75) Inventor: Isaac Cohen, Dix Hills, NY (US)

(73) Assignee: Lambda Electronics, Melville, NY (US)

( * ) Notice: Subject to any disclaimer, the term of this patent is extended or adjusted under 35 U.S.C. 154(b) by 486 days.

(21) Appl. No.: 09/684,850

(22) Filed: Oct. 6, 2000

Related U.S. Application Data

(60) Provisional application No. 60/158,539, filed on Oct. 8, 1999.

(51) Int. Cl.[7] ............................................. H02M 3/335
(52) U.S. Cl. ......................................... 363/89; 363/97
(58) Field of Search ............................ 363/78, 80, 81, 363/84, 89, 95, 97

(56) References Cited

U.S. PATENT DOCUMENTS

| | | | |
|---|---|---|---|
| 4,857,822 A | 8/1989 | Tabisz et al. | |
| 4,922,404 A | 5/1990 | Ludwig et al. | |
| 5,029,062 A | * | 7/1991 | Capel ........................... 363/26 |
| 5,528,482 A | 6/1996 | Rozman | |
| 5,721,483 A | 2/1998 | Kolluri et al. | |
| 5,872,705 A | 2/1999 | Loftus, Jr. et al. | |
| 5,920,475 A | 7/1999 | Boylan et al. | |
| 5,999,417 A | 12/1999 | Schlecht | |
| 6,002,597 A | 12/1999 | Rozman | |
| 6,011,703 A | 1/2000 | Boylan et al. | |
| 6,055,170 A | * | 4/2000 | Yee ............................. 363/89 |

FOREIGN PATENT DOCUMENTS

| | | |
|---|---|---|
| FR | 2608857 A | 6/1988 |
| WO | WO 98/54827 A | 12/1998 |

OTHER PUBLICATIONS

J.A. Cobos: "Self Driven Synchronous Rectification in Resonant Topologies: Forward ZVS-MRC, Forward ZCS-QRC and LCC-PRC."
A. Vithanage et al.: "150W board mounted power supply module using highly compact and efficient sysnchronous rectifiers", IEEE, pp. 177-183, XP000873665.

* cited by examiner

*Primary Examiner*—Adolf Berhane
(74) *Attorney, Agent, or Firm*—Morgan & Finnegan LLP

(57) ABSTRACT

A method and system for providing synchronous rectification in power converters that includes controlling turnoff of a synchronous rectifier according to a timing signal representative of the switching time of a switch that is coupled to input of the power converter. Such a timing signal may be obtained directly or indirectly in various ways; for example, by sensing the voltage across the primary switch, or by sensing the drive voltage of the primary switch. Additional alternatives in an isolated converter having a transformer with a primary winding that is selectively coupled to the electrical power source includes sensing the primary winding voltage, for example, by directly sensing the primary voltage or by sensing the voltage across an auxiliary winding that is closely coupled to the primary winding.

44 Claims, 11 Drawing Sheets

DRIVE CIRCUITS FOR SYNCHRONOUS RECTIFIERS

This application claims the benefit of U.S. Provisional Application No. 60/158,539, filed Oct. 8, 1999.

FIELD OF THE INVENTION

The present invention relates to synchronous rectification in switchmode converters, and more specifically, to generating drive signals for synchronous rectifiers that may be implemented in various DC-to-DC converter topologies.

BACKGROUND OF THE INVENTION

Conventional switchmode converters typically include passive rectifying devices, such as Schottky diodes, through which output or load current flows during operation. In order to reduce conduction losses and improve efficiency, however, a passive rectifying device may be replaced with an active switching device (e.g., a transistor), referred to as a synchronous rectifier. Such a synchronous rectifier may be periodically driven into conduction and non-conduction modes in synchronism with a periodic waveform.

A problem associated with using transistors as synchronous rectifiers is the requirement for properly timed drive signals to control the switching of the synchronous rectifier transistors. For example, improper timing of synchronous rectifiers in DC to DC converters may result in cross conduction through the rectifier at times other than the commutation interval, and/or in reverse recovery currents caused by the conduction of the body diode of one rectifier at the turn-on instant of the second rectifier. In the case of a converter providing electrical isolation between its input and output, this problem is more serious because the synchronous rectifier drives are isolated from the drives of the primary side transistors.

U.S. Pat. Nos. 5,872,705, 5,528,482, 5,303,138 relate to controlling the timing of the synchronous rectifiers in certain clamped converter topologies. Generally, these patents all describe using the voltage across the transformer secondary winding to directly drive the synchronous rectifier that should conduct while the transformer voltage is clamped. For example, U.S. Pat. No. 5,872,705 shows a clamped forward converter in which the flywheel rectifier is driven on in direct response to the secondary voltage being clamped during the reset interval, and is driven off in direct response to the secondary voltage not being clamped and the primary switch that couples the transformer primary winding to a DC power source being on. Such driving and timing control of the synchronous rectifiers is evidently not well suited for topologies that do not have a clamped secondary voltage signal. For example, as may be appreciated, in topologies that do not have such clamping, during the period that a primary switch (i.e., a switch that couples the transformer primary winding to a DC power source) is off (e.g., during the reset interval in a forward converter, or the flyback interval in a flyback converter), the magnitude of the secondary voltage may decrease to a level insufficient to maintain a synchronous rectifier in an on state for the desired time required to provide synchronous rectification and, a fortiori, the associated advantages would be lost. For instance, if the rectifier turns off before the current through it becomes negligible, then the current will flow through the rectifier's body diode, resulting in inefficiencies (e.g., losses) associated with, for example, reverse recovery currents as well as a larger voltage drop across the rectifier than if the rectifier remained on.

U.S. Pat. No. 6,011,703 relates to a self-synchronized gate drive for a synchronous rectifier. The self-synchronized gate drive includes a drive winding associated with the transformer secondary, and the drive winding is coupled to a discharge device and to a drive switch that in turn is connected to the control gate of a second rectifier. The primary winding of the transformer is selectively connected to a DC power source via a primary switch, in a conventional manner. While the primary switch is on, the drive winding voltage drives the drive switch and discharge device such that the discharge device is off and the control terminal of the second rectifier is charged, causing the second rectifier to be on. Alternatively, while the primary switch is off, the drive winding voltage is clamped and drives the drive switch and discharge device such that the discharge device discharges the control terminal of the second rectifier which is thus maintained off synchronously with the voltage on the secondary. It may be understood that if the magnitude of the secondary voltage were not maintained at a sufficient level during the period when the primary switch is off (e.g., the secondary voltage not clamped and the transformer resets before the end of the primary switch off period), synchronous rectification would not occur. Accordingly, as for the aforementioned patents, this patent also discloses using the secondary winding to control rectifier switch timing in a manner that may provide synchronous rectification in a limited range of topologies.

It may be appreciated, therefore, that there remains a need for further improvements and advancements in providing synchronous rectification in switchmode converters. For example, such improvements and advancements would provide sufficient timing accuracy to avoid the deleterious effects of, for example, cross-conduction and reverse recovery currents, while preferably also being well suited for myriad converter topologies (e.g., not limited to topologies that provide a clamped secondary voltage during the off-period of the primary switch).

In various applications, such as in switchmode power supply control, it is desirable to have a pulse width modulation (PWM) controller that has a maximum duty cycle which is not necessarily approximately 50% and which is preferably relatively temperature insensitive.

SUMMARY OF THE INVENTION

The present invention provides such advancements and overcomes the above mentioned problems and other limitations of the background and prior art, by providing a method and system for providing synchronous rectification in power converters that includes controlling turnoff of a synchronous rectifier according to a timing signal representative of the switching time of a switch that is coupled to an input of the power converter, such as a primary switch that selectively couples the power converter input to an electrical power source. In accordance with an aspect of the present invention, such a timing signal may be obtained directly or indirectly in various ways; for example, by sensing the voltage across the primary switch, or by sensing the drive voltage of the primary switch. Additional illustrative alternative ways for obtaining the timing signal in an isolated converter having a transformer with a primary winding that is selectively coupled to the electrical power source includes sensing the primary winding voltage, for example, by directly sensing the primary voltage or by sensing the voltage across an auxiliary winding that is closely coupled to the primary winding.

In accordance with an aspect of the present invention, a power converter comprises a rectifier device that includes a conduction control terminal and a bi-directional conduction path selectively enabled by the conduction control terminal, such that when the conduction control terminal is driven ON the bi-directional conduction path is activated to conduct current provided to an output of the power converter, and when the conduction control terminal is driven OFF the bi-directional conduction path is de-activated. The converter also includes a circuit that senses a timing signal representative of the approximate switch timing of the primary switch, and in response to the timing signal drives the conduction control terminal OFF to de-activate the bi-directional conduction path.

In accordance with another aspect of the present invention, the conduction control terminal of the rectifier is driven OFF relative to the timing signal representative of the switching time of the primary switch at a time when the output current conducted by the bi-directional conduction path to the output reduces to a substantially negligible amount. That is, such a timing signal may be used to turnoff a synchronous rectifier near or at the end of its commutation interval, namely, near or at the time that the current in the synchronous rectifier switch drops naturally to a negligible or approximately zero amount, but before any substantial or non-negligible current flows in a body diode associated with the synchronous rectifier. The time delay for driving turn OFF of the rectifier relative to the timing signal may be fixed or variable.

The rectifier may also be driven ON in response to the timing signal. Alternatively, in accordance with another aspect of the present invention, the rectifier is driven ON in response to a timing signal that is not a timing signal representative of the switch timing of the primary switch, turn ON and turn OFF of the rectifier thereby being driven independently. Turn-on of the rectifier is driven in response to a second timing signal that, at least during times when the timing signal transitions between levels corresponding to the primary switch switching between the conductive state and the substantially non-conductive state, is not substantially in phase with nor substantially a mirror of the approximate switch timing of the primary switch. The second signal is thus independent of a timing signal representative of the switching time of the primary switch.

In accordance with a further aspect of the present invention, synchronous rectifier control may be implemented in myriad topologies including forward, flyback and double-ended topologies, and is applicable to both clamped and unclamped implementations.

In accordance with yet another aspect of the present invention, in a power converter having a synchronous rectifier that includes a conduction control terminal and a bi-directional conduction path selectively enabled by the conduction control terminal, such that when the conduction control terminal is driven ON in response to a timing signal the bi-directional conduction path is activated to conduct output current provided to an output of the power converter, the amplitude of a drive signal applied to the conduction control terminal of the synchronous rectifier to drive the synchronous rectifier ON is modulated as a function of the output current of the power converter, such that when the output current decreases below an approximate threshold the drive signal is incapable of driving the rectifier ON in response to the second timing signal, the rectifier thereby being maintained OFF while the output current is below the approximate threshold.

According to yet another aspect of the present invention, a bias power supply is provided in a power converter that includes a transformer having a primary winding and a secondary winding, with a freewheeling rectifier and a forward rectifier coupled to the secondary winding, and a primary switch coupled to the primary winding to repetitively couple the winding to an electrical power source. The freewheeling rectifier and the forward rectifier each have respective associated body diodes. The power converter is also provided with a first diode that permits unidirectional current flow from a first end of the secondary winding to a node that provides the bias power supply, and a second diode that permits unidirectional current flow from a second end of the winding of the transformer to the node, wherein the first and second diodes form a bridge with the body diodes of the forward rectifier and the flywheel rectifier for providing the bias power supply in response to the primary switch repetitively coupling the primary winding to the electrical power source.

In accordance with an aspect of the present invention, the charging time of a sawtooth oscillator is alternately modified in successive charging intervals to provide a maximum duty cycle for a PWM that is effectively determined by the ratio of the charging times. In such a PWM, the sawtooth oscillator output signal is compared with another voltage signal (e.g., an error voltage signal) to provide modulation of the PWM output signal. In accordance with another aspect of the present invention, the period of a saw tooth oscillator is modified by modifying the charge time during the time the PWM output is high (or low) so the duty cycle generated by a flipflop (e.g., toggle type) of the PWM is modified to a fixed maximum value. In accordance with a further aspect of the present invention, the charge time is modified by modifying, during successive and alternating charging time intervals, the resistance that determines the charging current or rate. Such a resistance may, for example, determine the current of a current source, or the RC time constant of an RC type circuit.

BRIEF DESCRIPTION OF THE DRAWINGS

Additional aspects, features, and advantages of the invention will be understood and will become more readily apparent when the invention is considered in the light of the following description made in conjunction with the accompanying drawings, wherein:

FIG. 16 schematically depicts a Polikarpov-type converter, implemented with synchronous rectification in accordance with an embodiment of the present invention;

DETAILED DESCRIPTION OF EMBODIMENTS OF THE INVENTION

Figure 1:
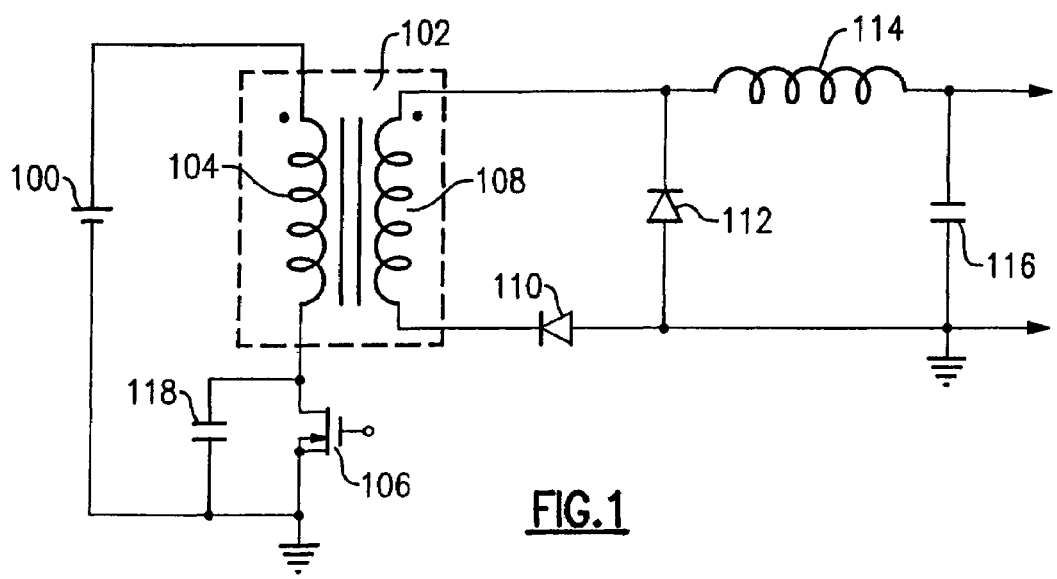
FIG. 1 is an illustration of a conventional resonant reset forward converter.

Prior to describing various illustrative embodiments of the invention, the present invention may be better appreciated with reference to FIG. 1, which schematically depicts a conventional resonant reset forward converter, which includes a transformer 102 having a primary winding 104 connected in series with a DC power source 100 (of voltage Vin) and a primary transistor 106, which has an associated parallel capacitance 118. Secondary winding 108 of transformer 102 is connected in series with a forward rectifier 110, and this series connection is connected in parallel with a freewheel rectifier 112. Forward rectifier 110 and freewheel rectifier 112 are situated to permit current flow to the converter output through filter inductor 114 at one end of filter capacitor 116. It may be appreciated that capacitance 118, sometimes referred to as a snubbing capacitance, schematically represents intrinsic capacitances (e.g., parasitic capacitances) as well as any extrinsic capacitances (i.e., additionally added capacitor components). For example, a design may not employ an additional external capacitor, but rely solely on intrinsic capacitances (e.g., the output capacitance of primary transistor 106, as well as the reflected junction capacitance of forward rectifier 110).

For clarity of exposition, detailed design (e.g., selecting magnetizing inductance and snubbing capacitance values to ensure core reset, selecting output inductor value, etc.) and operation of such a circuit are not described herein, as such design and operation are well known to ordinarily skilled artisans and not essential to understanding the present invention. Yet the present invention may be better appreciated based on the following general operational description of the conventional resonant reset converter of FIG. 1, with reference to FIG. 2A and FIG. 2B, which illustrate approximate voltage waveforms across primary winding 104 and secondary winding 108, respectively.

Primary transistor 106, shown as a metal oxide semiconductor field-effect transistor (MOSFET), is repetitively switched between an on state and an off state at a given switching frequency, and at a duty cycle, D, that is controlled by pulse-width modulation (PWM) to provide a regulated output voltage. As used herein, a MOSFET is "on" when its channel region is in a substantially low impedance state such that any current flow through the transistor is predominantly through the channel. In such a state, the transistor may conduct current bidirectionally (i.e., in either direction). In contrast, as used herein, a MOSFET is "off" when its channel is in an high impedance state such that there is essentially no current conduction through the channel (e.g., the current through the channel is insignificant relative to the currents designed to flow through the circuit, or relative to currents that may flow through the channel when the transistor is on). In this "off" state, however, a MOSFET can conduct current unidirectionally through its intrinsic body diode.

While primary transistor 106 is on, the full input voltage $V_{in}$ is applied across primary winding 104, inducing a corresponding voltage across secondary winding 108, which causes current to flow through secondary winding 108 and filter inductor 114 via rectifier 110, thereby storing energy in filter inductor 114. No current flows through freewheel rectifier 112, as it is reverse biased.

Upon turn off (i.e., opening) of primary transistor 106, the voltage across primary transistor 106 increases and the corresponding voltage across primary winding 104 reverses to a negative value as capacitance 118 is initially charged. As this reset period (i.e., primary transistor 106 off) continues, consonant with the operation of the resonant circuit formed between the capacitance 118 and the transformer's magnetizing inductance, the magnetizing energy is reset and the voltage across primary transistor 106 settles back to about $V_{in}$ (i.e., corresponding to an approximately zero voltage across primary winding 104).

During this reset interval, the voltage across secondary winding 108 attempts to follow the voltage across primary winding 104. When primary transistor 106 opens and the primary voltage decreases and swings negative, however, the voltage across secondary winding 108 cannot become negative, but remains at approximately zero volts, until current flowing through forward rectifier 110 decreases to about zero. More specifically, upon turning off primary transistor 106, a period of time (referred to herein as first commutation interval, T1) elapses before substantially all the output current transfers from forward rectifier 110 to freewheel rectifier 112. Within this first commutation interval, as current decreases through forward rectifier 110, the diminished current is compensated for by an increasing current through freewheel rectifier 112. The current flow through forward rectifier 110 during the first commutation interval effectively shorts secondary winding 108, preventing its voltage from decreasing below about zero. Once current flowing through forward rectifier 110 and secondary winding 108 reduces to about zero, however, the voltage across secondary winding 108 may fall below zero. Yet it is also noted that because of reverse recovery effects (i.e., associated with charge storage in the rectifier), once current in forward rectifier 110 falls to about zero at the end of the first commutation interval, it will continue to decrease to a non-negligible current below zero, then increase back to about zero, and freewheel rectifier 112 will therefore conduct this reverse recovery current in addition to the load current. This transient reverse recovery current further prevents the secondary voltage from becoming negative, thus extending the time that the secondary winding is effectively shorted, and also represents energy loss and noise (e.g., electromagnetic interference (EMI)).

Upon turning on primary transistor 106, the voltage across primary winding 104 increases to the full input voltage $V_{in}$ as capacitance 118 discharges. The voltage across secondary winding 108 attempts to follow the voltage across primary winding 104; however, the voltage across secondary winding 108 cannot become positive, but remains at approximately zero volts, until current flowing through freewheel rectifier 112 decreases to about zero. More specifically, upon turning on primary transistor 106, a period of time (referred to herein as second commutation interval, T2) elapses before substantially all the output current transfers from freewheel rectifier 112 to forward rectifier 110. Within this second commutation interval, as current decreases through freewheel rectifier 112, the diminished current is compensated for by an increasing current through forward rectifier 112. The current flow through freewheel rectifier 112 during this second commutation interval (i.e., while forward rectifier 110 also conducts) effectively shorts secondary winding 108, preventing its voltage from increasing above about zero. Once current flowing through freewheel rectifier 112 reduces to about zero, however, the voltage across secondary winding 108 may increase above the nominal zero level. It is also noted that because of reverse recovery effects (i.e., associated with charge storage in the rectifier), once current in freewheel rectifier 112 falls to about zero at the end of the second commutation interval, it will continue to decrease to a non-negligible value below zero, then increase back to about zero, and forward rectifier 110 will therefore conduct this reverse recovery current in addition to the load current. Analogous to the reverse recovery current associated with the first commutation interval, this transient reverse recovery current further prevents the secondary voltage from becoming positive, and also represents energy loss and noise (e.g., EMI).

Figure 2A:
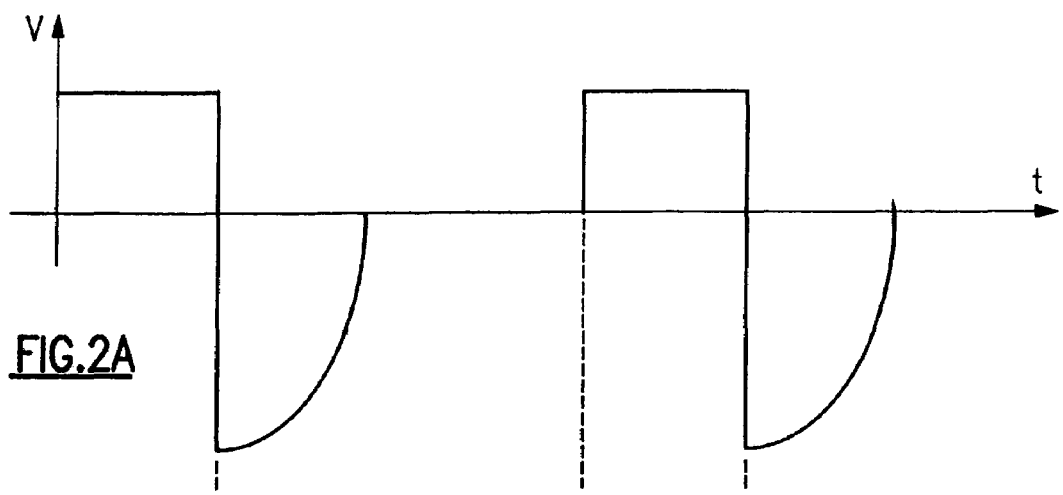
FIG. 2A illustrates the approximate voltage across the primary winding of the transformer of the converter of FIG. 1.
Figure 2B:
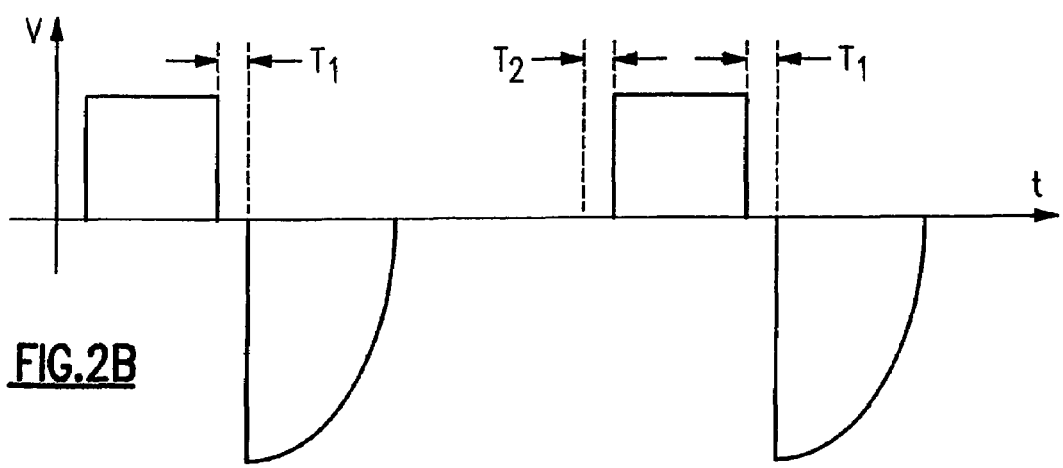
FIG. 2B illustrates the approximate voltage across the secondary winding of the transformer of the converter of FIG. 1.

Accordingly, from the foregoing general operational description of a conventional forward resonant converter, it may be appreciated that, as shown in FIGS. 2A and 2B, the voltage across secondary winding 108 substantially follows the voltage across primary winding 104, except that it is shorted to about zero volts during the commutation intervals T1 and T2 (i.e., the intervals when the forward output current of one rectifier commutates to the other rectifier), and during reverse recovery current intervals. It is also understood that the voltage waveforms shown in FIGS. 2A and 2B are merely schematic; for example, as understood from the foregoing operational description, actual waveforms have finite slopes at switching transitions and their profiles during resetting depend on not only the primary magnetizing inductance and snubbing capacitance 118 but also, the operating conditions, such as the input voltage (i.e., the line) and the load (e.g., the output current).

As described, rectifiers 110 and 112 are typically and preferably implemented as synchronous rectifiers by using, for example, MOSFET switches that are controllably switched between their on and off states. In view of the foregoing, it is further understood that during the commutation intervals if either of these switches were turned off too soon, current through the switch would be diverted to its intrinsic body diode (and also to any parallel, externally connected diode), thus resulting in reverse recovery transients. Alternatively, if either one of these switches were turned off too late after the commutation interval, significant cross conduction and shorting of the output may result. From the foregoing, it may also be further appreciated how using the secondary voltage to control synchronous rectification as described, for example, in the patents referred to in the background section, supra, is limited to certain topologies (e.g., clamped) and not well suited for mitigating reverse recovery transients.

In accordance with the present invention, synchronous rectification in a power converter is controlled by using a timing signal representative of the primary switching time (i.e., the switching time of the primary switch) to trigger at least turnoff, and also preferably turn-on, of one or more synchronous rectifiers that selectively conduct(s) output current of the power converter. In converters employing galvanic isolation, such a timing signal may be provided by a timing signal representative of the voltage across the primary winding of the transformer, and such one or more synchronous rectifiers (e.g., implemented as MOSFET switches) are on the secondary side of the transformer. As used herein, and as will be appreciated from the ensuing illustrative embodiments, a timing signal representative of the primary winding voltage refers to a signal that is substantially in phase with or substantially mirrors (disregarding polarity) the primary winding voltage at least during the time that the primary winding voltage transitions between positive and negative voltages. For example, in a resonant reset forward converter topology, a timing signal representative of the primary winding voltage includes, for example, a voltage sensed directly across the winding, a voltage across an additional transformer winding closely coupled to the primary winding, the drain voltage of the primary transistor (e.g., referenced to its grounded source), or the gate voltage of the primary transistor. Stated differently, for isolated converters having a primary switch that selectively couples a primary winding of the transformer to a power source, a primary switch voltage (e.g., drain voltage, or gate voltage) corresponds to the primary winding voltage, and thus, as used herein, a timing signal representative of the primary switch voltage corresponds to a timing signal representative of the primary winding voltage.

More generally, each of these timing signals may be referred to as a timing signal representative of the primary switching time, or as a timing signal representative of the primary switch state. As may also be understood, for a resonant reset forward converter, or in essentially any other converter topology that on the secondary winding(s) side (i.e., the winding(s) conductively coupled to the load) includes, for example, a freewheeling rectifier, a flywheel rectifier, or two rectifiers that commutate the load current between them, the secondary voltage will not provide such a timing signal because (e.g., due to current commutation) the secondary voltage is neither substantially in phase with nor substantially a mirror image of the primary winding voltage (and thus, nor of the primary switch voltage, nor of the primary switching time) during the time that the primary winding voltage transitions between positive and negative voltages. Simply, as used herein, a signal that cannot transition until the current commutation that is caused by the switching of a primary switch is essentially complete cannot be said to be a signal representative of the primary switching time (also referred to herein as the primary switch timing).

Those skilled in the art will also understand in view of the herein description, that the present invention is also applicable to non-isolated converters; in such applications, a timing signal representative of the primary switch timing, consonant with the above description for isolated converters, is a signal that is substantially in phase with or substantially mirrors (disregarding polarity) a primary switch voltage (e.g., for a MOSFET, its gate drive voltage or its drain voltage) at least during the time that the primary switch voltage transitions between its "high" and "low" voltages as the primary transistor transitions between its two states.

In accordance with an embodiment of the present invention, such a timing signal may be used to turnoff one or more synchronous rectifiers near or at the end of their respective commutation intervals, namely, near or at the time that the current in the synchronous rectifier channel drops naturally to approximately zero, after the time that any substantial or non-negligible current would be diverted from the channel to the body diode associated with the synchronous rectifier, and before any substantial or non-negligible cross-conduction would occur. As may be appreciated from the foregoing, the turn on timing of the synchronous rectifiers typically is not as critical as turnoff timing, as the body diode can carry the current until the channel is on. Thus, although the timing signal may be advantageously used as a stable triggering time reference for turn-on, other signals may be used to control or trigger turn-on (e.g., the voltage across the secondary).

Figure 3:
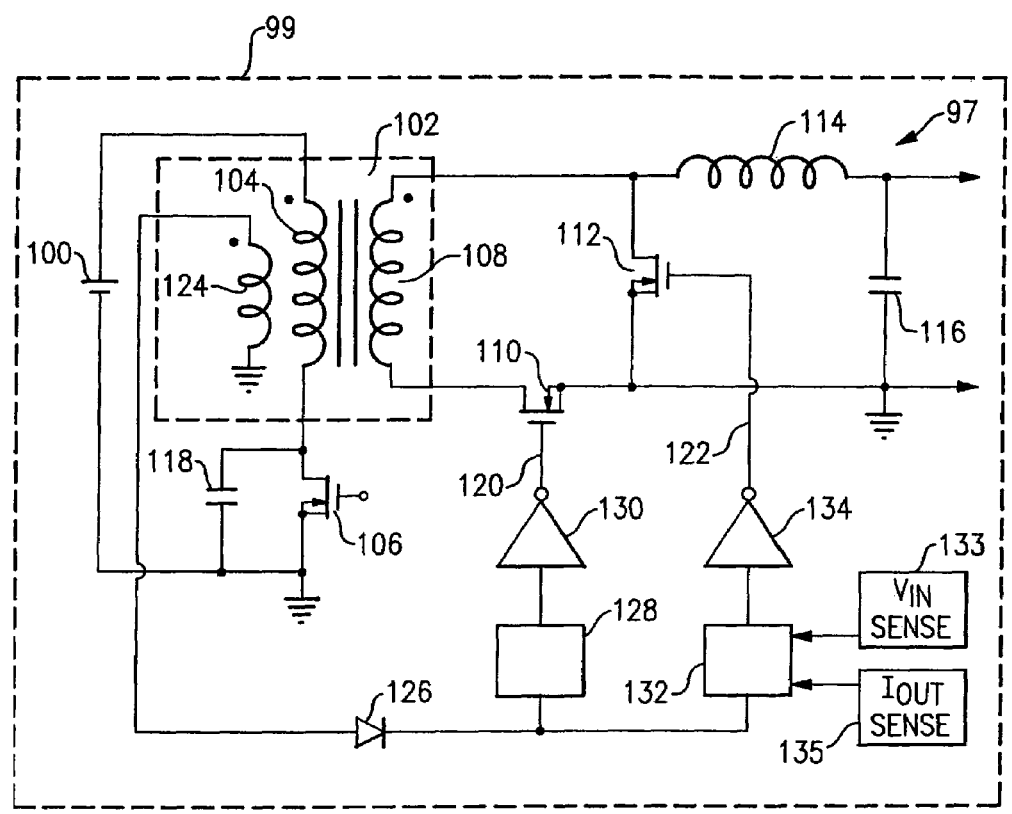
FIG. 3 schematically depicts a forward converter with the rectifiers implemented with transistors, and an auxiliary winding closely coupled to the primary winding to provide a timing signal from which appropriately delayed rectifier drive signals are generated, in accordance with an embodiment of the present invention.

Referring now to FIG. 3, there is shown a schematic representation of a system 99 that includes a resonant reset forward converter 97 with the rectifiers implemented as synchronous rectifiers that are controllably switched according to a timing signal indicative of the voltage across the primary winding, in accordance with an embodiment of the present invention. As appreciated by those skilled in the art, system 99 may be any of myriad systems that incorporates a power converter, such as a power supply, a computer, a repeater or router used in communications systems, or virtually any other electronic or optoelectronic system that incorporates a power converter. More specifically, transformer 102 includes a sense winding 124 that is closely coupled to primary winding 104 such that the voltage generated by sense winding 124 is substantially an exact replica of the voltage across primary winding 104, including during rectifier commutation intervals when the voltage across secondary winding 108 is shorted to about zero volts and thus does not substantially represent the voltage across primary winding 104. Forward rectifier 110 and freewheel rectifier 112 are shown as being implemented as transistors (shown as MOSFETs) that are respectively driven with forward rectifier drive signal 120 and freewheel drive signal 122, respectively, which drive signals are generated according to the voltage across primary winding 104 as sensed with sense winding 124.

As implemented in the embodiment of FIG. 3, the voltage observed by sense winding 124 is applied via diode 126 to a forward rectifier delay block 128 and to a freewheel rectifier delay block 132, which have respective outputs applied to a forward rectifier driver 130 and a freewheel rectifier driver 134, which in turn generate respective drive signals 120 and 122. In operation, during the on-time of primary transistor 106 (excluding the commutation interval during which output current commutates from freewheel rectifier 112 to forward rectifier 110), forward rectifier 110 is on to provide a low impedance path for current flow through secondary winding 108, and freewheel rectifier 112 is off to avoid shorting secondary winding 108. Upon primary transistor 106 turning off, starting the commutation interval during which output current commutates from forward rectifier 110 to rectifier 112, the input voltage to forward rectifier delay block 128 and freewheel rectifier delay block 132 goes low. Thereafter, the respective outputs of forward rectifier delay block 128 and freewheel rectifier delay block 132 go low after respective first and second delays, causing forward rectifier driver 130 to drive forward rectifier control signal 120 low, turning off forward rectifier 110, and causing freewheel rectifier driver 134 to drive freewheel rectifier control signal 122 high, turning on freewheel rectifier 112.

During the remaining off-time of primary transistor 106 (i.e., excluding the commutation interval during which output current commutates from forward rectifier 110 to freewheel rectifier 112), forward rectifier 110 is off to prevent reverse current flow through secondary winding 108, and freewheel rectifier 112 is on to provide a low impedance, low voltage drop path for conducting the output current that flows through filter inductor 114. Upon primary transistor 106 turning on, commencing the commutation interval during which output current commutates from freewheel rectifier 112 to rectifier 110, the input voltage to forward rectifier delay block 128 and freewheel rectifier delay block 132 goes high. Thereafter, the respective outputs of forward rectifier delay block 128 and freewheel rectifier delay block 132 go low after respective third and fourth delays, causing forward rectifier driver 130 to drive forward rectifier control signal 120 high, turning on forward rectifier 110, and causing freewheel rectifier driver 134 to drive freewheel rectifier control signal 122 low, turning off freewheel rectifier 112.

Depending on the implementation, the delays provided by delay blocks 128 and 132 at turn-on and turn-off of primary transistor 106 may be fixed (i.e., constant) or variable (e.g., dependent upon one or more circuit parameters, such as output current, output voltage, input voltage, duty cycle, etc.), and may be negligible (e.g., no added delay) or non-negligible (e.g,. comparable to) relative to the commutation intervals. For example, as described more fully below, in accordance with an embodiment of the present invention, at turn-off of primary transistor 106, (i) the output of freewheel rectifier delay block 132 becomes low with essentially no delay from its input going low such that freewheel rectifier driver 134 drives freewheel rectifier control signal 122 high to turn on freewheel rectifier 112 at essentially (e.g., at or near) the beginning of the first commutation interval (i.e., no intentionally added delay), and (ii) the output of delay block 128 becomes low a fixed delay time approximately equal to the first commutation interval, T1, after its input goes low such that forward rectifier driver 130 drives forward rectifier control signal 120 low to turn off forward rectifier 110 at approximately the end of the first commutation interval. Additionally, in this embodiment, at turn-on of primary transistor 106, (i) the output of forward rectifier delay block 128 goes high with essentially no delay after its input goes high such that forward rectifier driver 130 drives forward rectifier control signal 120 high to turn on forward rectifier 110 at essentially the beginning of the second commutation interval, and (ii) the output of freewheel rectifier delay block 132 goes high a variable delay approximately equal to the second commutation interval, T2, after its input goes high such that freewheel rectifier driver 134 drives freewheel rectifier control signal 122 low to turn off freewheel rectifier 112 at essentially the end of the second commutation interval. As described further below, this variable delay is directly proportional to the output current of the converter, and inversely proportional to the converter input voltage, $V_{in}$. It may be appreciated that implementing the switch timing in the described manner advantageously minimizes or eliminates deleterious effects (e.g., inefficiency, losses, overvoltages, EMI, etc.) associated with body diode conduction of the output current.

Implementing such synchronous rectifier switch timing relative to the primary switching events (i.e., relative to a signal representative of the voltage across the primary winding) in this embodiment may be further understood as follows. As may be appreciated in view of the foregoing description of FIGS. 1, 2A and 2B, during the first commutation interval, T1, turning off forward rectifier 110 too soon before the current flowing through it reaches approximately zero causes conduction of the body diode and reverse recovery currents, whereas turning off forward rectifier 110 too late after the current through it decreases to approximately zero can result in cross-conduction of the synchronous rectifiers with non-negligible current flowing through secondary winding 108 in the opposite direction. Accordingly, forward rectifier 110 may be advantageously turned off after a delay of about T1 from when primary transistor 106 is turned off. The time between the negative going zero crossing of the voltage across primary winding 104 to the end of the commutation of current from forward rectifier 110 to freewheel rectifier 112 (T1) is virtually independent of the input voltage ($V_{in}$) and the output current ($I_{out}$), and is approximately equal to one-fourth the resonant period of the circuit formed by the leakage inductance of transformer 102, $L_e$, and the effective snubber capacitance 118, $C_{SNB}$, which represents the effective total capacitance coupled across the transformer series inductance when primary transistor 106 is turned off. Specifically, $$T1 \cong \frac{1}{4} \times 2\pi \sqrt{L_e C_{SNB}}$$

Therefore, the timing for switching forward rectifier 110 can be generated by detecting the negative going zero crossing instant of the flyback voltage across transformer 102, and turning forward rectifier 110 off after a fixed delay, approximately equal to T1, from this instant.

Freewheel rectifier 112 is advantageously turned on at the beginning of the first commutation interval to permit low voltage drop current flow. This turn-on time is not critical, however, because the body diode of freewheel rectifier 112 will conduct current until it is turned on, at which point the current will transferring to the channel of freewheel rectifier 112. Therefore, freewheel rectifier 112 may be turned on after a short (minimum=0) and non-critical delay, measured after the negative going zero crossing of the voltage across primary winding 104.

During the second commutation interval, wherein current shifts from freewheel rectifier 112 to forward rectifier 110, the turn-on timing of forward rectifier 110 is analogous to the described turn-on of freewheel rectifier 112 during the first commutation interval. That is, forward rectifier 110 may be advantageously turned on at the beginning of the second commutation interval to permit low voltage drop current flow; however, turning it on later than this time is not critical because the body diode of forward rectifier 110 will nevertheless conduct commutating current, which will gradually transfer to the channel of forward rectifier 110 once it is turned on. Therefore, forward rectifier 110 can be turned on after a short (minimum=0) and non-critical delay, measured after the positive going zero crossing of the voltage across primary winding 104.

During the second commutation interval, as described, freewheel rectifier 112 is advantageously turned off when the current flowing through it reaches approximately zero. Turning off freewheel rectifier 112 too soon before this event results in conduction of the body diode and thus reverse recovery currents; however, turning off freewheel rectifier 112 too late after this event can result in significant cross-conduction and converter output shorting. Therefore, freewheel rectifier 112 is advantageously turned off after a delay of about T2 from when primary transistor 106 is turned on. In particular, it can be shown that after primary transistor 106 is turned on, the time interval from the positive zero crossing of the voltage across primary winding 104 ($V_{pri}$) to the moment the current in freewheel rectifier 112 drops to zero may be approximately represented by the following expression:

$$T2 = k \times \frac{I_{out}(t_2)}{V_{in}}$$

where $I_{out}(t_2)$ is the value of the output current prior to turning on primary transistor 106, $V_{in}$ is the input voltage, and k is an appropriate proportionality constant. Accordingly, as schematically depicted in FIG. 3, delay block 134 may control the turn-off timing of freewheel rectifier 112 by detecting the positive going zero crossing of the voltage across primary winding 104 and generating a variable delay based on the above expression for T2 in response to (i) a signal indicative of $I_{out}(t_2)$ generated by an output current sensing circuit 133 and (ii) a signal indicative of input voltage $V_{in}$ generated by an input voltage sensing circuit 135. Those skilled in the art understand that there are many ways of implementing output current sensing circuit 133 and input voltage sensing circuit 135. For example, the information on the value of the output current can be derived from the negative slope of the primary voltage, which is inversely proportional to the value of the output current. Thus, by differentiating this slope and saving (e.g., sample-and-hold or slow discharge peak detection), the resulting voltage will be proportional to the output current.

It is noted that the above estimated expressions for T1 and T2 are useful in designing appropriate delay circuits; however, in order to minimize errors, the parasitic delay of the circuits should be minimized and the residual delays should be subtracted from the ideal delay values described above. Further, practical designs of such delay circuits may include calibration mechanisms (e.g., using trim potentiometers) for adjusting (e.g., optimizing) the respective fixed and variable delays for turning off the synchronous rectifiers. Additionally, those skilled in the art understand that, in practice, the allowable tolerance in controlling the timing of these switching events depends on the relative amount of body diode conduction current and/or reverse current that occurs and can be tolerated in a particular design.

Figure 4:
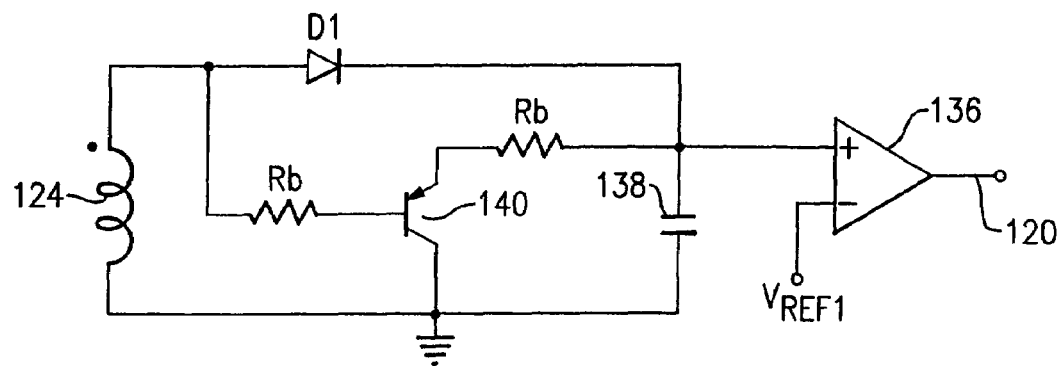
FIG. 4 is a schematic illustration of a circuit for generating a forward rectifier control signal, in accordance with an embodiment of the present invention.

FIG. 4 depicts an illustrative embodiment of a circuit for generating forward rectifier control signal 120 for controlling triggering of forward rectifier 110. A reference voltage $V_{ref1}$ is input to the inverting terminal of comparator 136. When primary transistor 106 turns on, the voltage sensed by sense winding 124 increases and becomes positive, causing capacitor 138 to rapidly charge via diode D1, and thus applying an increasing voltage to the non-inverting terminal of comparator 136. When the voltage at the positive terminal of comparator 136 rises above the reference voltage $V_{ref1}$, forward rectifier control signal 120 turns on, which turns on forward rectifier 110. When primary transistor 106 turns off, the voltage across sense winding 124 decreases and becomes negative, causing transistor 140 (the base of which is coupled to winding 124 via base resistor Rb) to turn on. Transistor 140 drains charge off of capacitor 138 via discharge resistor Rd at a rate controlled by the RC time constant of the circuit (i.e., about the product of Rd and capacitance 138). When the voltage at the positive terminal of comparator 136 falls below the reference voltage $V_{ref1}$, forward rectifier control signal 120 turns off, turning off forward rectifier 110. Consequently, the time delay can be accurately controlled with the RC time constant and $V_{ref1}$ to approximately equal T1.

Figure 5:
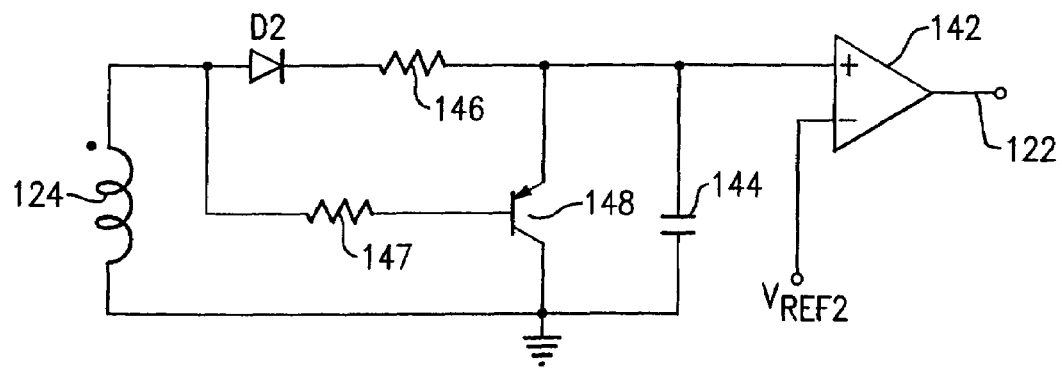
FIG. 5 is a schematic illustration of a circuit for generating a freewheel (or flywheel) rectifier control signal, in accordance with an embodiment of the present invention.

FIG. 5 illustrates an embodiment of a circuit for generating freewheel rectifier control signal 122 for triggering freewheel rectifier 112. A reference voltage $V_{ref2}$ is input to the positive terminal of comparator 142. Particularly, $V_{ref2}$ may be generated by various well known techniques to be proportional to the output current prior to turning on primary transistor 106, and inversely proportional to the input voltage. For example, as noted above, a signal proportional to this output current value may be derived from the negative slope of the primary voltage (e.g., sensed with winding 124). When primary transistor 106 turns on, the voltage across sense winding 124 increases and becomes positive, causing capacitor 144 to begin charging via diode D2 through resistor 146, thus applying an increasing positive voltage to the inverting terminal of comparator 142. When the voltage at the inverting terminal of comparator 142 rises above the reference voltage $V_{ref2}$ freewheel rectifier control signal 122 turns off, turning off freewheel rectifier 112. Consequently, a time delay of T2 can be accurately controlled with the RC time constant and $V_{ref2}$; or When primary transistor 106 turns off, the voltage across sense winding 124 decreases and becomes negative, causing transistor 148 (the base of which is coupled to winding 124 via base resistor 147) to turn on. Transistor 148 thus rapidly discharges capacitor 144 so that the voltage at the negative terminal of comparator 142 falls below the reference voltage of the positive terminal, causing freewheel rectifier control signal 122 to turn on, and turning on freewheel rectifier 112.

Prior to describing some illustrative alternative embodiments of the present invention, it is noted that in the case of actively clamped converters, the conduction intervals of the synchronous rectifiers and the drive timing requirements are essentially identical to those existing in the forward converter circuit discussed above. As a result, the circuit of the embodiment described above will operate equally well in actively clamped converters. It is also noted that those skilled in the art understand that for clarity of exposition the implementation shown in FIG. 3 is merely schematic, and that there are myriad ways of implementing circuitry that couples the voltage observed by sense winding 124 to drive freewheel rectifier 112 and/or forward rectifier 110. For example, it may be appreciated that although the operational blocks (e.g., delay blocks 132 and 128, drivers 130 and 134, etc.) are shown to functionally indicate that the voltage sensed across primary winding 104 may be appropriately delayed and buffered to drive synchronous rectifiers 112 and 110, actual circuitry need not implement the delay and buffering functions in a serial fashion (e.g., both the delay and buffering may be provided by a common circuit). Similarly, while delay block 132 (128) may represent an additional delay intentionally introduced along the signal path between the voltage across sense winding 124 and drive signal 122 (120), in various embodiments such an additional intentional delay may not be implemented and thus, for example, delay block 132 (128) may only represent the intrinsic delay (e.g., gate delay) of driver 134 (130). That is, depending on the implementation, intentional delays may or may not be necessary for turn-on and/or turn-off of at least one synchronous rectifier. Intentional delays may be fixed (i.e., constant) or variable (e.g., dependent upon one or more circuit parameters, such as output current, output voltage, input voltage, duty cycle, etc.). As yet a further illustrative example of alternative embodiments within the purview of the present invention, both turn-on and turn-off of both synchronous rectifiers need not be driven in response to the voltage observed by sense winding 124. Stated alternatively, the voltage observed by sense winding 124 may be coupled to drive turn-on and/or turn-off for at least one synchronous rectifier, with any turn-on and/or turn-off not so controlled being driven in response to other triggering signal(s) (e.g., the secondary winding voltage). For clarity of exposition, some illustrative alternative embodiments of the present invention are further described below.

In one alternative embodiment of the present invention, the circuit shown in FIG. 3 may be modified such that the voltage across secondary winding 108 is used for driving forward rectifier 110, with freewheel rectifer 112 being driven in response to the primary winding voltage as described and shown above. Although driving forward rectifier 110 in this manner is not necessarily optimal, it may be adequate in certain applications. In such an implementation, the drive voltage for forward rectifier 110 is zero during the commutation intervals. The absence of drive voltage for forward rectifier 110 during the second commutation interval T2 is not a problem, since the current can flow through the body diode until the drive voltage is applied. However, at the termination of the drive, at the beginning of the first commutation interval T1, the absence of drive voltage may cause a problem. Forward rectifier 110 is turned off and the full inductor current will be transferred from its channel to the body diode at the beginning of the commutation interval T1. As a result, the body diode will have to recover at the end of the commutation interval, causing a number of potentially serious problems, such as increased losses and electromagnetic interference (EMI). Thus, the voltage across secondary winding 108 is not generally adequate for driving freewheel rectifier 112 but, as noted, may be adequate in some specific applications.

Figure 6:
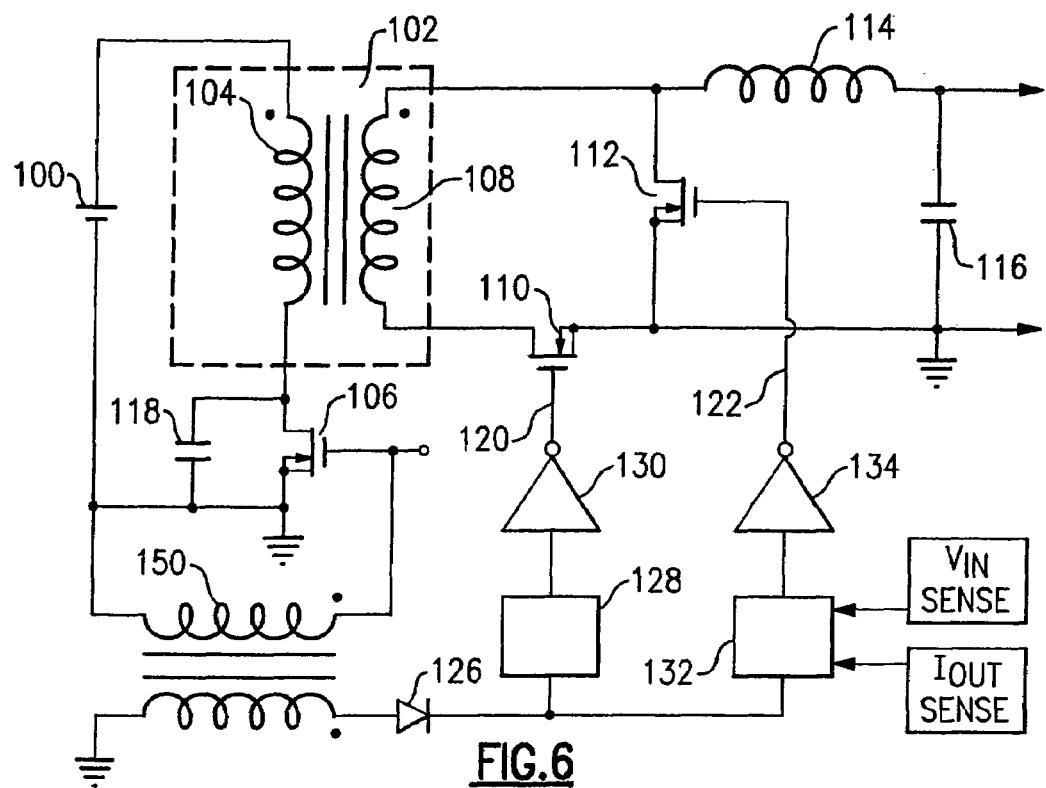
FIG. 6 depicts resonant reset forward converter with synchronous rectification control signals generated by observing the drive signal for the primary transistor, in accordance with an embodiment of the present invention.

Another embodiment is shown in FIG. 6, in which forward rectifier control signal 120 and freewheel rectifier control signal 122 are generated in response to sensing the drive signal for primary transistor 106 (which is representative of the voltage across primary winding 104) with transformer 150. When primary transistor 106 turns off, transformer 150 senses the low drive signal with its primary winding, and applies a low signal to the inputs of forward rectifier delay block 128 and freewheel rectifier delay block 132 with its secondary winding. When primary transistor 106 turns on, transformer 150 senses the high drive signal with its primary winding, and applies a high signal to the inputs of forward rectifier delay block 128 and freewheel rectifier delay block 132 with its secondary winding. In all other respects, the operation of the circuit is essentially the same as the embodiment described above.

Figure 7:
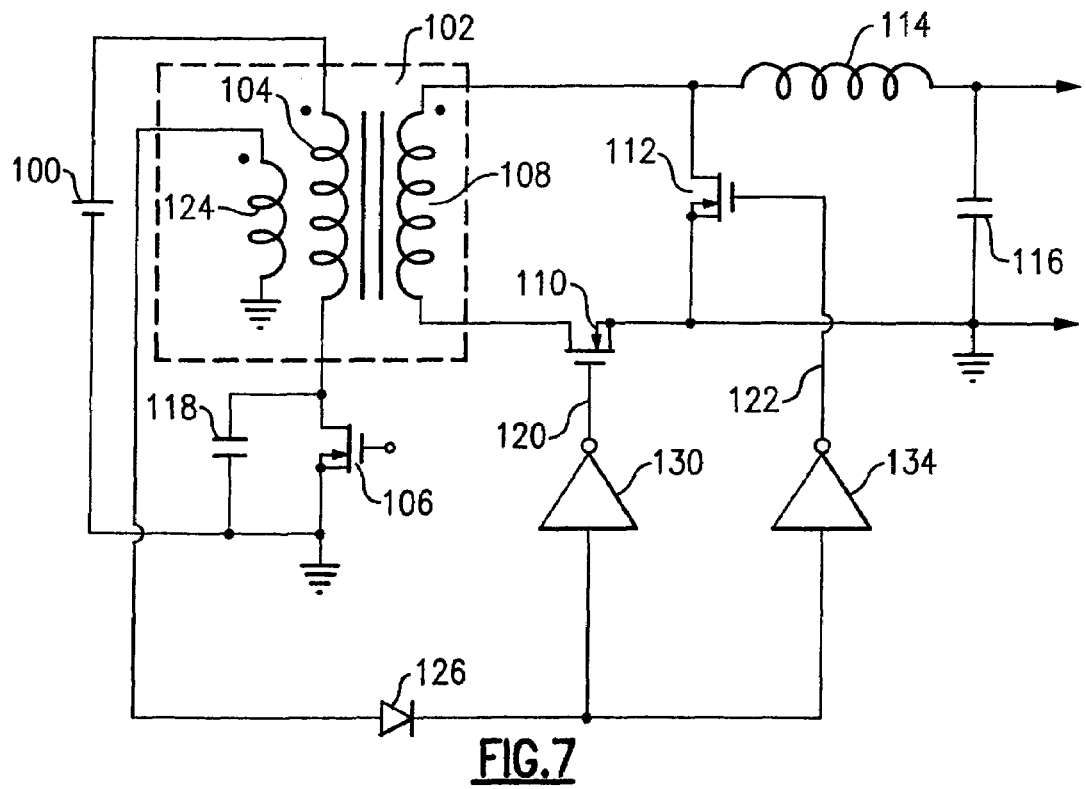
FIG. 7 depicts an alternative implementation for driving synchronous rectifiers of a resonant reset forward converter, in accordance with an embodiment of the present invention.

Referring to FIG. 7, depicted is an illustrative embodiment which may be implemented, for example, in cases where a certain degree of cross conduction and/or reverse recovery current can be tolerated. In these cases, the variable delay generating circuit can be eliminated and the synchronous rectifiers may be driven simply by complementary signals (direct and inverted) generated (without any intentionally added delay; e.g. only with intrinsic delay) by forward rectifier driver 130 and freewheel rectifier driver 134 in response to a signal representative of the primary winding voltage. Although the signals in this case may not be optimal, the inherent delay associated with the drivers may actually improve the operation instead of being detrimental. If delays longer than the natural delay of the drivers yield better performance, the delays can be artificially increased to the optimal value.

Figure 8:
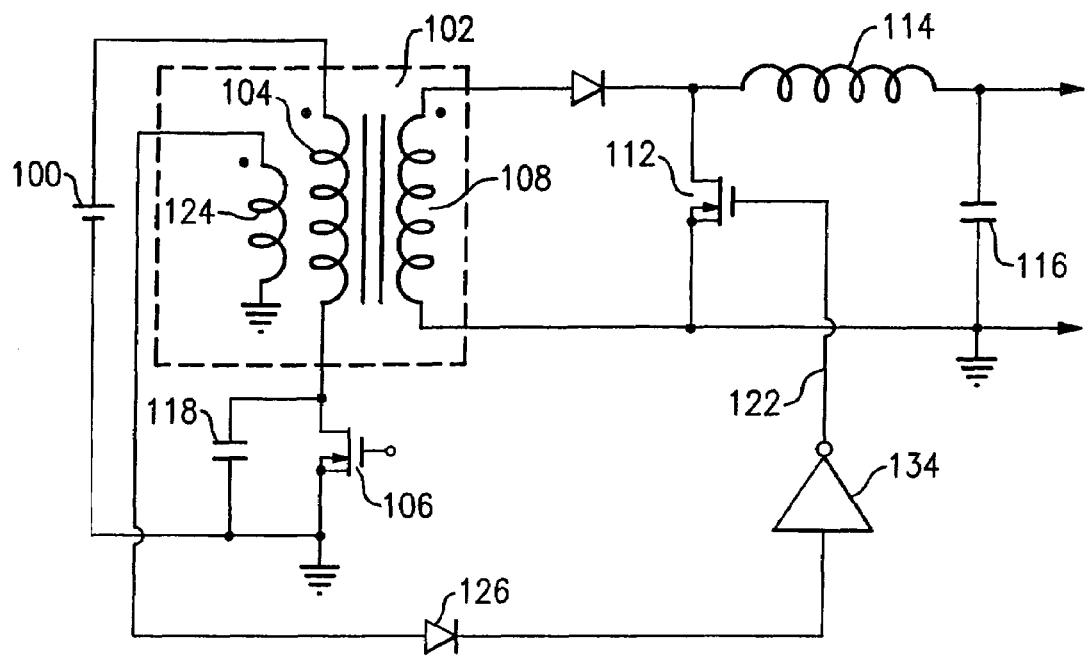
FIG. 8 shows a resonant reset forward converter with the forward rectifier implemented as a Schottky rectifier, and the freewheel rectifier implemented as a synchronous rectifier, in accordance with an embodiment of the present invention.

Referring to FIG. 8, shown is an embodiment which may be applicable, for example, in applications where the operating duty cycle of forward rectifier 110 may be considerably lower than the duty cycle of freewheel rectifier 112. In such applications, the cost of replacing a diode (e.g., Schottky) rectifier with a MOSFET may not be justified by the relatively small improvement in efficiency. Therefore, as shown, forward rectifier 110 may be implemented as a Schottky rectifier, and synchronous rectification may be employed only for freewheel rectifier 112, with the drive signal therefor being provided in accordance with the present invention.

Figure 9:
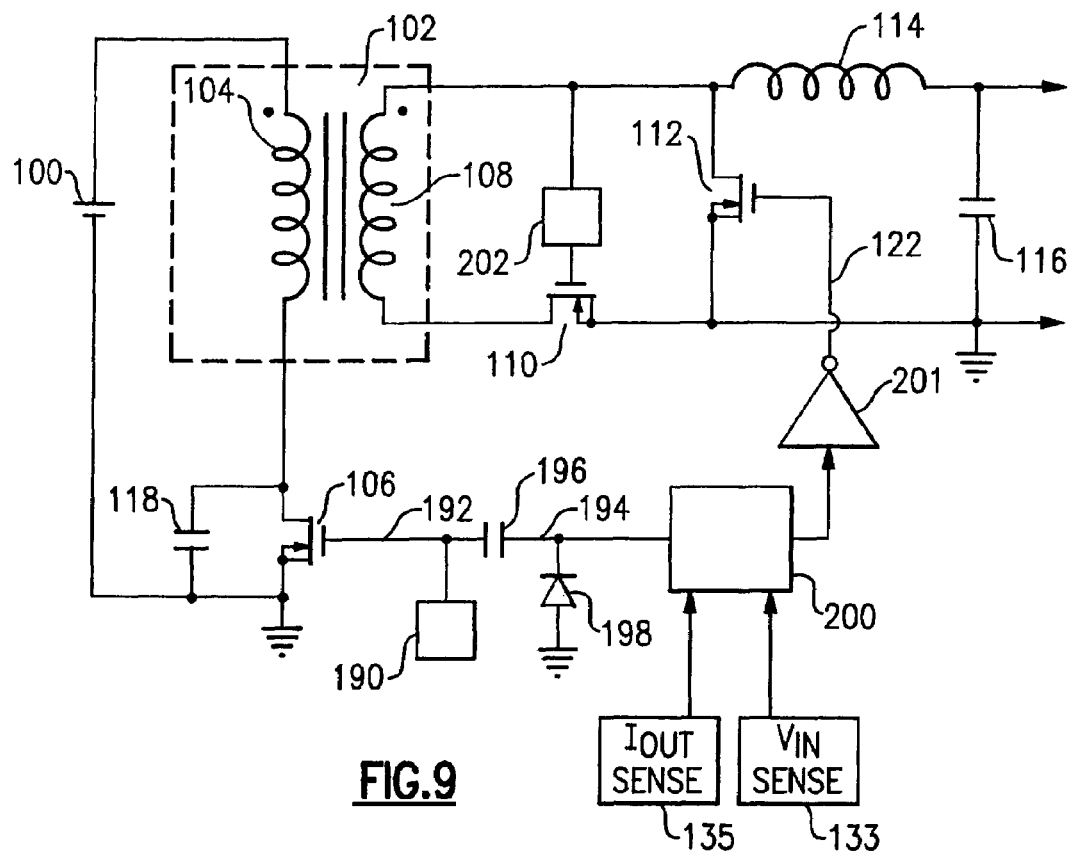
FIG. 9 illustrates a resonant reset forward converter with capacitive coupling of the primary switch gate drive to provide a timing signal for synchronous rectification, in accordance with an embodiment of the present invention.

FIG. 9 shows an embodiment of the present invention in which the timing signal for driving the synchronous rectifier(s) is derived by capacitive coupling to a voltage representative of the primary winding voltage. More specifically, in this embodiment, the primary transistor gate drive signal is used as the timing signal. As shown, primary transistor driver 190 generates primary transistor control signal 192 for controlling switching of primary transistor 106. Driving primary transistor control signal 192 high to turn on primary transistor 106 causes signal 194 to go high through coupling capacitor 196, and thus causes freewheel rectifier driver 200 to turn off freewheel rectifier 112 after a delay introduced by delay block 200. Depending on the application, the delay may be, for example, either proportional to the current in filter inductor 114 and inversely proportional to the value of the input voltage 100 (e.g., optimized to turn-off when the current through rectifier 112 decrease to about zero), or fixed at a compromised value. Likewise, the increasing secondary voltage at the input of forward rectifier driver 202 causes forward rectifier 110 to turn on without delay.

Driving primary transistor control signal 192 low to turn off primary transistor 106 causes signal 194 to go low through coupling capacitor 196. Clamping diode 198 maintains signal 194 above a minimum threshold. The output of delay block 200 becomes low with essentially no intentional delay after signal 194 goes low, and thus freewheel rectifier driver 200 turns on freewheel rectifier 112 at about the time that control signal 192 is driven low. As the current decreases through secondary winding 108 of transformer 102, the voltage input to forward rectifier driver 202 decreases. Forward rectifier driver 202 has a fixed delay approximately equal to ¼ of the natural period of the snubbing capacitance and the effective series inductance of transformer 102. After the fixed delay, forward rectifier driver 202 turns off forward rectifier 110.

Figure 10:
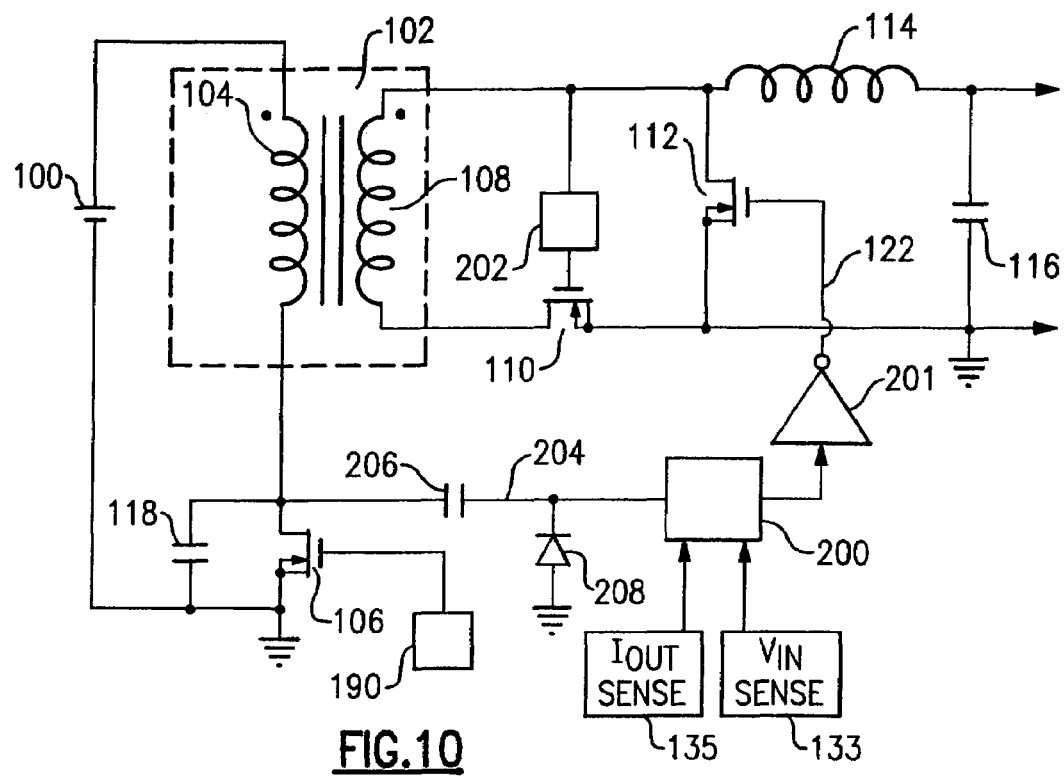
FIG. 10 illustrates a resonant reset forward converter with capacitive coupling of the primary switch drain voltage to provide a timing signal for synchronous rectification, in accordance with an embodiment of the present invention.

FIG. 10 shows another embodiment for capacitively coupling the primary to the secondary to provide a timing reference for the synchronous rectifier(s). In this embodiment, the drain voltage of primary switch 106 is capacitively coupled, instead of its gate drive signal as in the embodiment of FIG. 10. Turning primary transistor 106 off causes signal 204 to go high through coupling capacitor 206. Signal 204 is input to delay block 208 which in response provides an output without delay to freewheel rectifier driver 200 which turns on freewheel rectifier 112. Turning primary transistor 106 on causes signal 204 to go low through coupling capacitor 206. Clamping diode 208 maintains signal 204 above a minimum threshold. Signal 204 is input to freewheel rectifier driver 200, which turns off freewheel rectifier 112 after a delay, as described above. The timing for forward rectifier 110 is essentially the same as described for FIG. 9.

Figure 11:
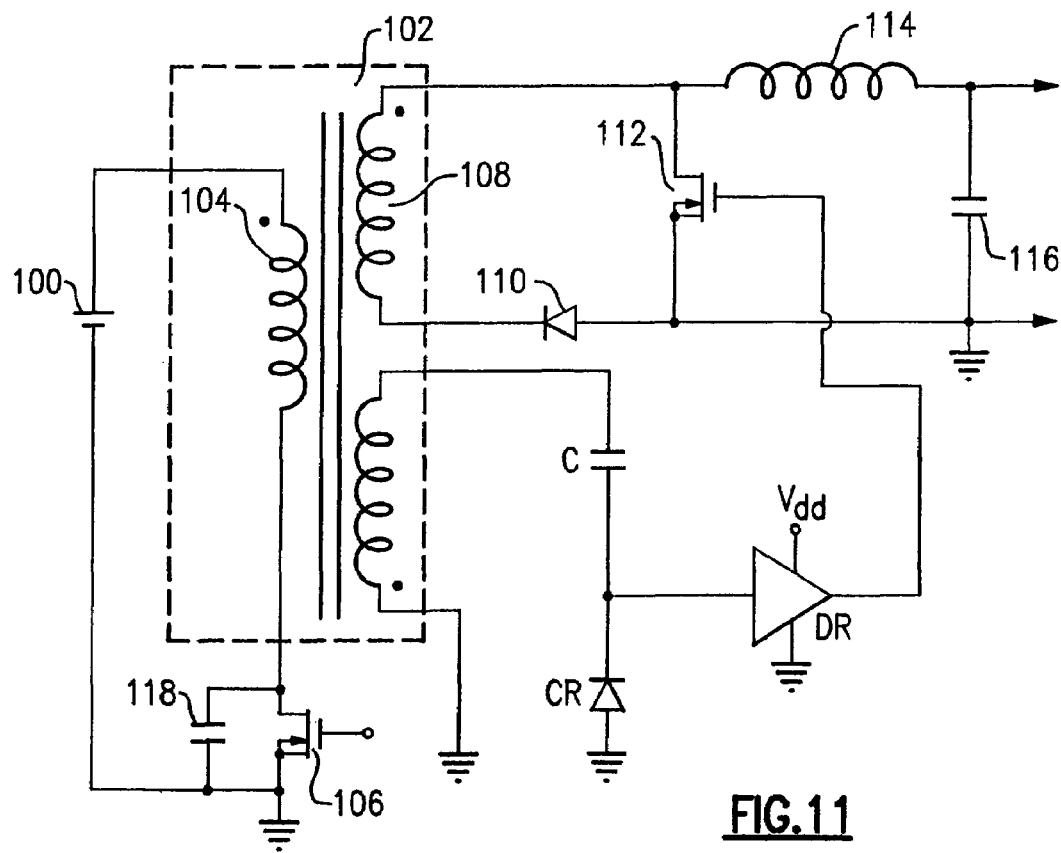
FIG. 11 depicts a resonant reset forward converter with capacitive coupling of the voltage across an auxiliary winding closely coupled to the primary winding to provide a timing signal for synchronous rectification, in accordance with an embodiment of the present invention.

Referring now to FIG. 11, in accordance with yet a further illustrative embodiment of the present invention, there shown a power converter implementing a synchronous drive by capacitively coupling the signal of an auxiliary winding that is closely coupled to the primary winding. The voltage on winding Wx is clamped to ground by capacitor C and diode CR. As a result, the voltage at the input of buffer/driver Dr is logically "high" whenever the primary switch 106 is off, and thus appropriately controls the switching of synchronous freewheel rectifier 112 via buffer/driver Dr (which is shown coupled between a supply voltage $V_{dd}$ and ground). As may be appreciated, operation is similar to that of the circuit of FIG. 10, except that the isolation is via a transformer. It may also be understood that winding Wx is generalized, namely, it may be any transformer winding of appropriate polarity, provided it is closely coupled to the primary winding.

It is noted that while the embodiments of FIGS. 9, 10, and 11 show only the freewheel rectifier being driven in response to the capacitively coupled timing signal from primary transistor 106, this timing signal may also be used for triggering the drive of the forward rectifier, in essentially the same manner described for the embodiments of FIGS. 3 and 7. It is also noted that in the embodiments of FIGS. 10 and 11, in a practical implementation, the network coupling the sensed primary switch voltage to the input of the delay block may be modified by adding at the node that is clamped to ground another clamp to a voltage source (e.g., Vdd), thereby limiting the "high" value of the signal input to the delay block. Additionally, a resistor may be added between the coupling capacitor (e.g., FIG. 10, capacitor 206) and the clamped node (e.g., FIG. 10, the anode of diode 208) such that the RC time constant of the resistor and coupling capacitor is chosen to ensure that the coupling capacitor continues charging during the entire "off" time of primary transistor 106, thus ensuring that the freewheeling synchronous rectifier is on during this entire period. A diode may be connected in parallel with this resistor to shunt it when the primary transistor is turned on (i.e., the diode's anode connected to the coupling capacitor terminal).

Prior to describing further illustrative embodiments, variations, and features of the present invention, with reference to the foregoing embodiments, it is important to note that the voltage appearing on secondary winding 108 cannot be used as the signal source for the drive circuit of the freewheel rectifier. In order for freewheel rectifier 112 to turn off, the signal at the input of freewheel rectifier driver 134 must go high. The secondary winding voltage, however, cannot go high unless freewheel rectifier 112 turns off. Consequently, if the voltage across secondary winding 108 (instead of primary winding 104) were coupled as the signal source for driving freewheel rectifier 112, freewheel rectifier 112 would latch on, permanently shorting the output of the converter. Such an inapplicability of the secondary winding voltage as a drive signal may be generalized to certain synchronous rectifiers of other topologies as well, wherein the synchronous rectifier cannot be turned off in response to the secondary winding voltage because it effectively shorts the secondary winding in response to the switching event (e.g., of a primary switch) when it should be turned off.

Figure 12:
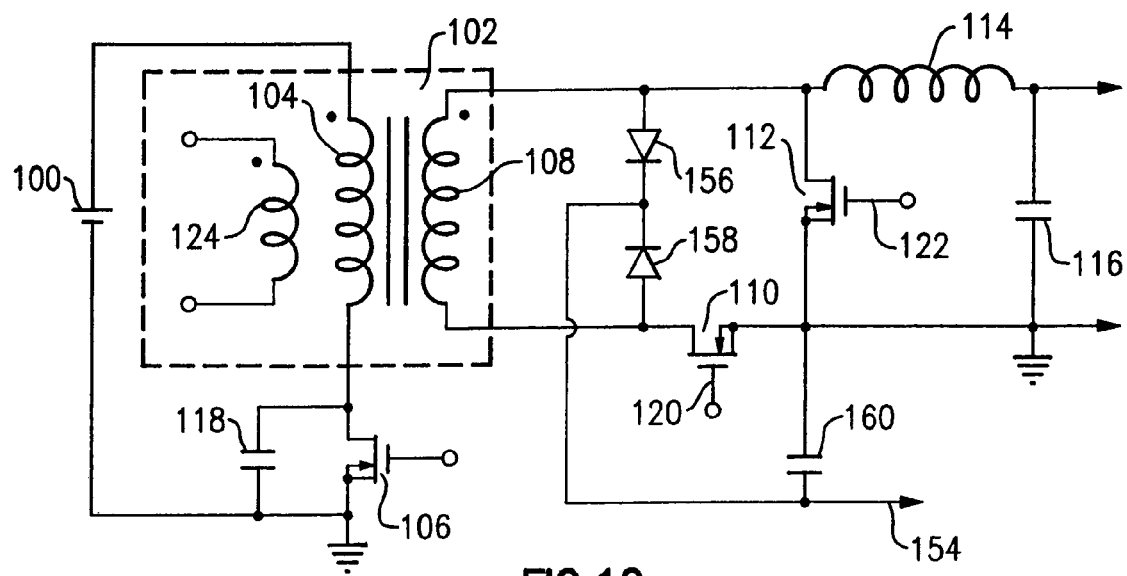
FIG. 12 schematically depicts a resonant reset forward converter that provides a bias power supply by using the synchronous rectifiers and additional diodes to provide a bridge, in accordance with an embodiment of the present invention.

Referring now to FIG. 12, in accordance with another feature and embodiment of the present invention, circuitry may be added for generating a bias power supply 154. Bias power supply 154 may be used for comparators and buffers, for example. Diode 156 and diode 158 form a bridge with the body diodes of forward rectifier 110 and freewheel rectifier 112. The bridge rectifies the voltage across secondary winding 108, and capacitor 160 filters the rectified voltage to generate bias power supply 154. As may be appreciated, bias power supply 154 is advantageously generated from the secondary winding of transformer 102, which provides increased immunity from variations in the input voltage (e.g., compared to the primary winding), as well as galvanic isolation. Although in FIG. 12 the bias power supply circuitry is shown for convenience as being implemented in a resonant reset forward converter of the general type described for the foregoing embodiments, those skilled in the art will understand that this technique for providing a bias power supply is applicable regardless of whether synchronous rectification is employed, and is also well suited, for example, for clamped topologies.

Figure 13:
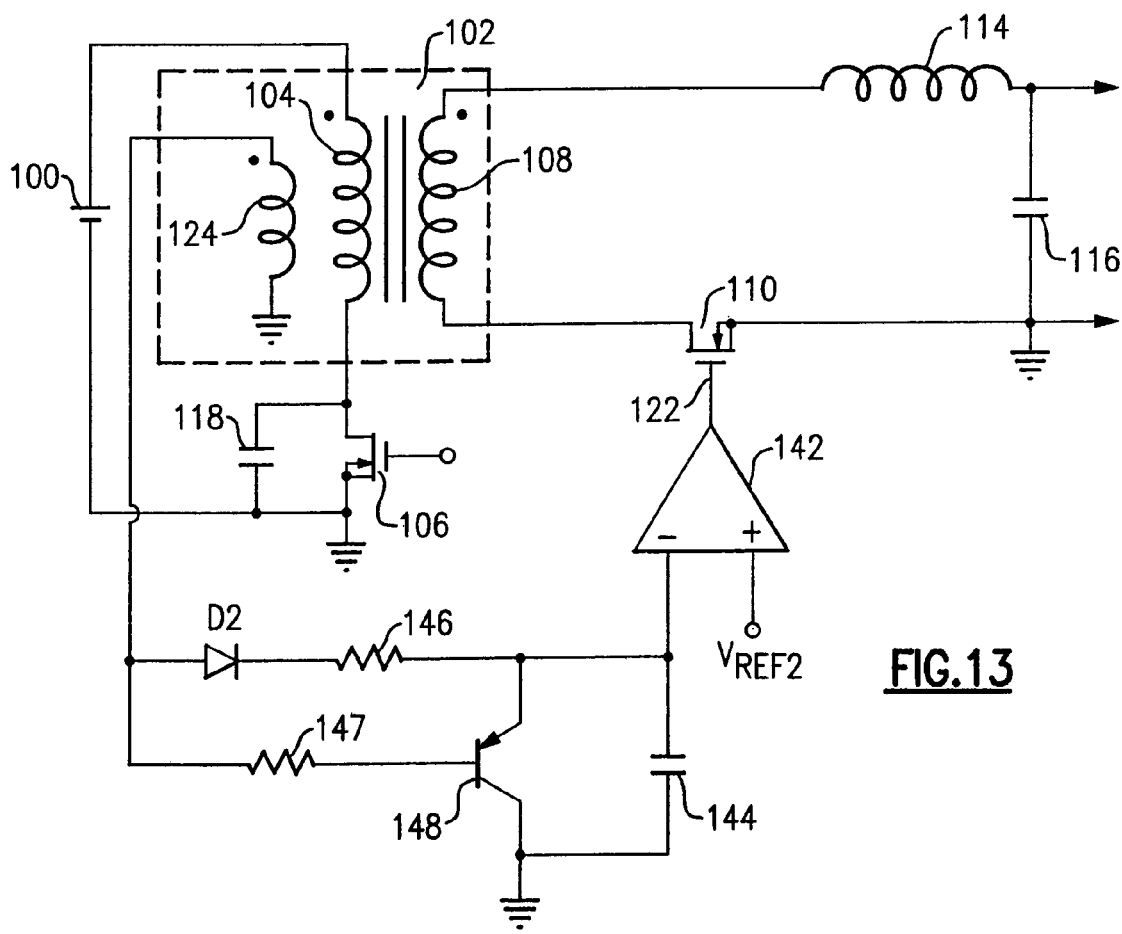
FIG. 13 shows a flyback converter with synchronous rectification, in accordance with an embodiment of the present invention.

FIG. 13 illustrates a flyback converter with synchronous rectification implemented in accordance with another embodiment of the present invention. In the case of a flyback converter, the timing of the synchronous rectification drive for the flywheel rectifier is similar to the drive for the freewheel of the forward converter, and thus an essentially identical circuit can be used to drive it (the same circuit as shown in FIG. 5). It is again noted that $V_{ref2}$ is proportional to the output current (e.g., secondary winding current) at the instant primary switch 106 is turned on, and preferably is also inversely proportional to the input voltage Vin. Alternatively, the timing signal can be derived from the drive of the main switch (i.e., primary switch 106) instead of from an auxiliary winding 124; however, in this case, the information on the value of the input voltage is not available in the timing signal and will thus be lost, as the primary switch drive is generally regulated.

As may be appreciated from the foregoing illustrative embodiments, since the delay required for optimal drive of the freewheel rectifier is directly proportional to the output current, the delay required at very low output currents may be very low. In certain cases, the reduction of the delay to the desired very low values may not be feasible due to the inherent delays in the drive circuits, and thus cross conduction of the synchronous rectifiers may occur when the output current drops to low value. In accordance with another feature of the present invention, this problem can be overcome by making the amplitude of the gate drive signal proportional to the load current. As a result, as the load current decreases towards zero, the gate signal will eventually vanish; at very light loads the operation of the synchronous rectifiers will cease and the possibility of cross conduction will be eliminated.

An additional important benefit of this approach is that the possibility of current reversal in the synchronous rectifiers is also eliminated, allowing direct parallel operation of synchronously rectified converters and eliminating the inherent positive feedback and the possibility of sustained oscillations which occurs when converters using self driven synchronous rectifiers are connected in parallel. It is also important to recognize that since the load current will be low when the synchronous rectifiers do not operate, the reverse recovery current of the body diodes will be reduced to insignificant values such that their effects will be negligible and/or tolerable.

Figure 14:
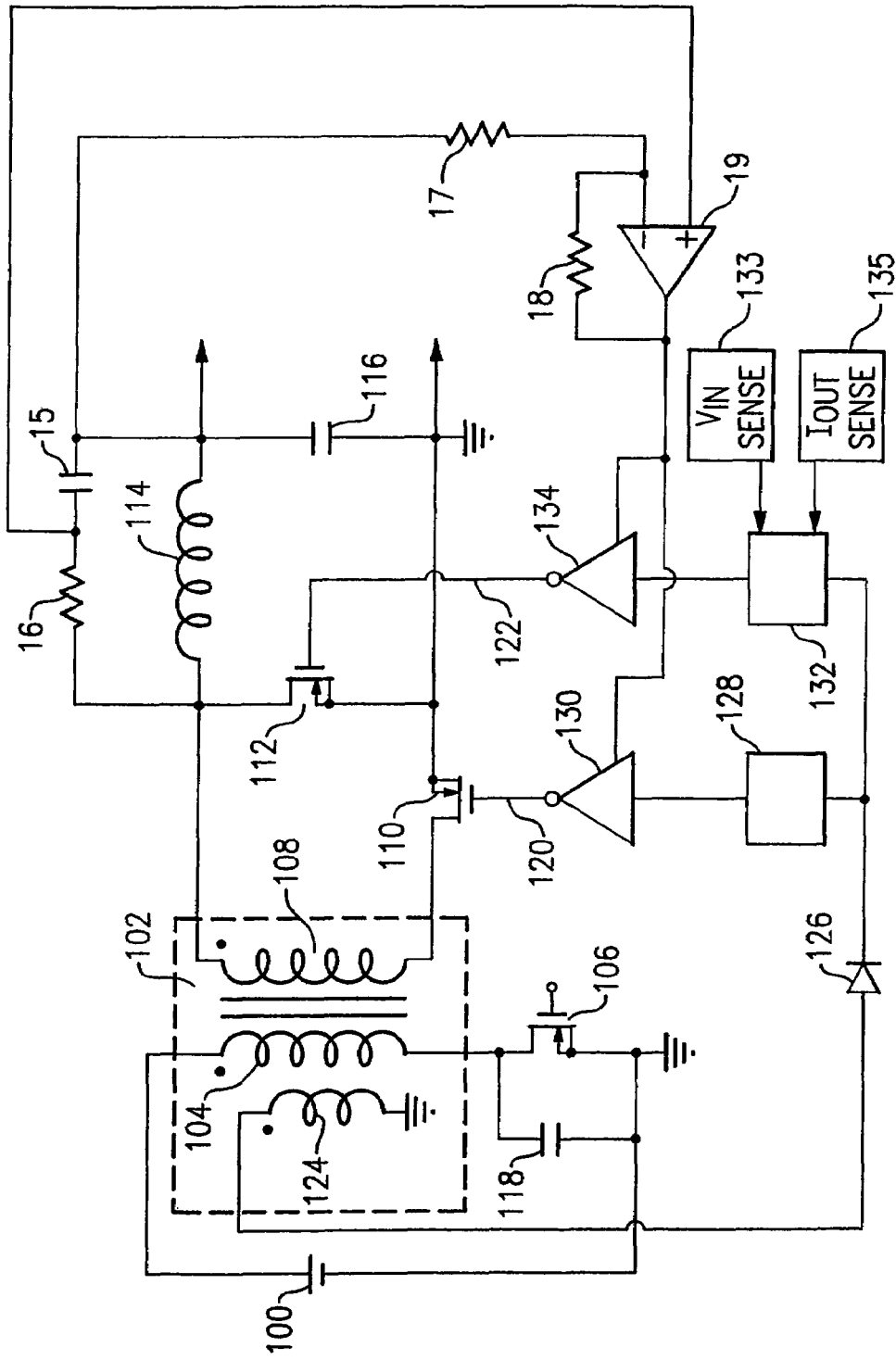
FIG. 14 shows a resonant reset forward converter implementing amplitude modulation of the synchronous rectifier drive signals as a function of the load current, in accordance with an embodiment of the present invention.

An embodiment implementing such amplitude modulation of the drive signal as a function of the load current for a synchronous rectifier in a resonant reset forward converter is shown in FIG. 14. A filter circuit consisting of resistor 16 and capacitor 15 extracts a DC voltage drop across the ohmic resistance of output inductor 114, thus providing to the non-inverting input of amplifier 19 a voltage that is proportional to the output load current. Amplifier 19 amplifies this voltage, and the output voltage of amplifier 19 is used to provide the bias voltage for the drivers 130 and 134. The gain of amplifier 19, set by resistors 18 and 17, will determine the percentage of load at which the amplifier will saturate and its output voltage will cease to be proportional to the load current.

In alternative embodiments, the output current may be sensed using any of a variety of other methods, such as shunts, current transformers, etc. Additionally, the amplitude modulation may be generated according to any of variety of linear or non-linear functions of the output current, and possibly other circuit parameters as well (e.g., input voltage). Moreover, those familiar with the art will also recognize that modulating the amplitude of the drive signal as a function of the output current may be advantageously implemented in any of the embodiments described herein, as well as in any other synchronous rectifier drive circuits, including the self driven type.

In view of the foregoing description, those skilled in the art will also understand that the applicability of the above-described embodiments may readily be extended to double ended topologies, such as phase shifted bridges, conventional full and half bridges, etc. The extension may be understood, for example, by viewing double ended topologies as two sequentially operated single ended converters that share the transformer and the output filter.

Figure 15:
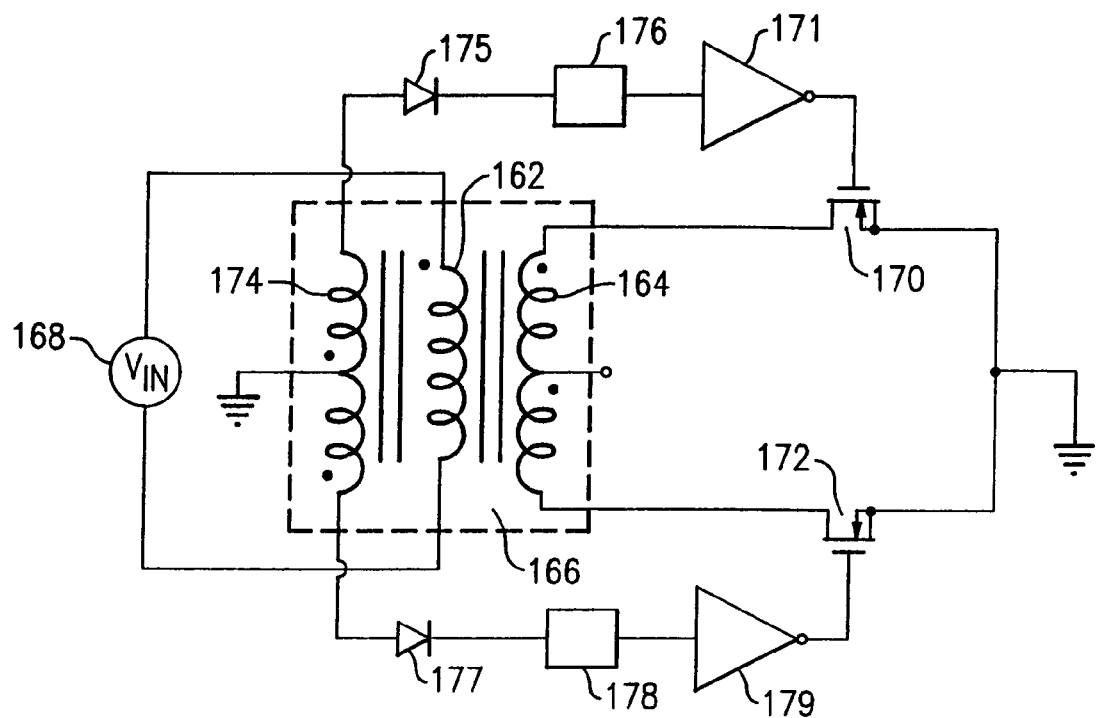
FIG. 15 is a schematic double-ended converter having synchronous rectification implemented in accordance with an embodiment of the present invention.

FIG. 15 depicts a generic double ended converter with a center-tapped secondary, implemented with synchronous rectifiers in accordance with an embodiment of the present invention. For the positive polarity interval of input voltage 168, the converter may be viewed as a forward converter comprising primary winding 162 and secondary winding 164 of transformer 166, with switches (synchronous rectifiers) 170 and 172 playing the role of forward rectifier 110 and freewheel rectifier 112, respectively. When the polarity of the input voltage reverses, the roles of the switches reverse, and the converter may be viewed as being operational as a second single ended converter, comprising primary winding 162 and secondary winding 163.

It is noted that when synchronous rectifier 170 operates as the forward rectifier for winding 164, it can also be considered to be the freewheel rectifier for winding 163, and synchronous rectifier 172 plays a corresponding role for windings 163 and 164, respectively. During the time when the voltage across winding 162 is zero, both devices 170 and 172 act as freewheeling rectifiers. Consequently, rectifier 170 must be on when the voltage across winding 162 is either zero or positive, and rectifier 172 must be on when the voltage on winding 162 is zero or negative. Drive timing for synchronous rectifiers 170 and 172 is respectively provided by sense windings 174 and 173, which make up a center-tapped auxiliary winding of transformer 166, which, as indicated previously in describing various single-ended embodiments, should be closely coupled to primary winding 162. The timing signals derived from these windings are respectively coupled to drivers 171 and 179 via diodes 175 and 177 delay blocks 176 and 178, which delay blocks may impose appropriate delays as described above (e.g., delays that cause the synchronous rectifiers to be turned off when the current through their respective channels is insubstantial, the delays being based, for example, on the output current that flows prior to the input polarity switching and on the discharge-related voltage).

Accordingly, it is appreciated that the operation of the circuit of FIG. 15 is essentially equivalent to the operation of the single ended circuit shown in FIG. 3, and also may readily be modified to operate in a manner similar to the illustrative circuits shown in FIGS. 6, 7, and 9–11. Further, those versed in the art will understand how to extend these circuits to any double-ended configuration.

Figure 16:
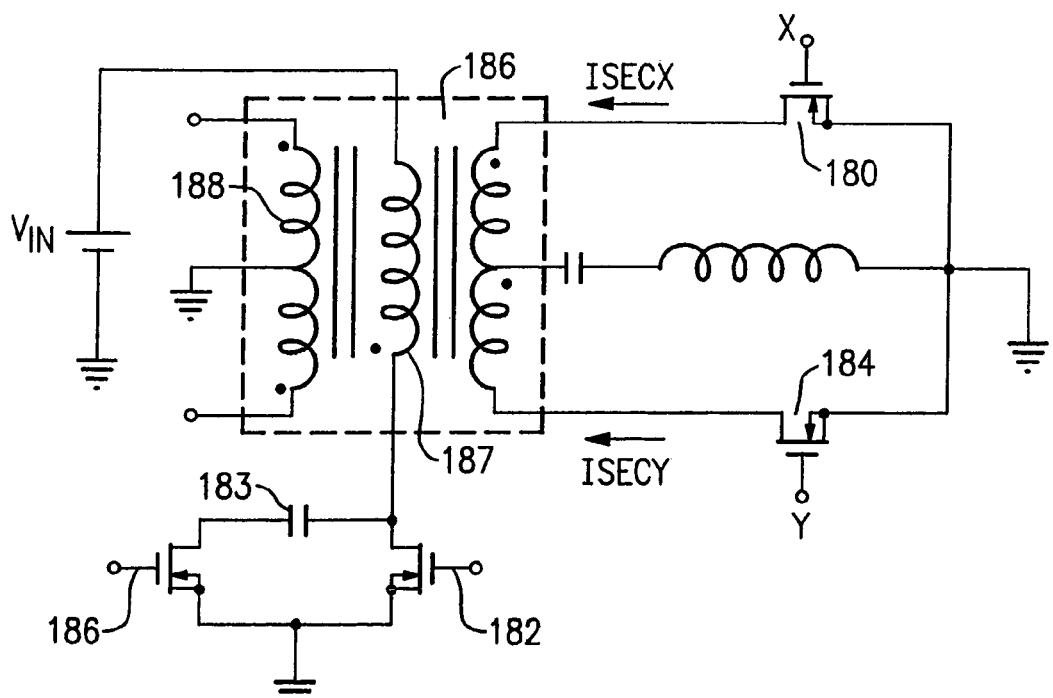
FIG. 16 is an illustration of another embodiment of a resonant reset forward converter with capacitive coupling.

FIG. 16 illustrates a double-ended clamped type converter, such as that described in Soviet Patent No. 892,614 to A. G. Polikarpov et al., published Dec. 23, 1981, implemented to include synchronous rectification in accordance with an embodiment of the present invention. As shown, the "Polikarpov type" converter has two rectifiers: rectifier 180 that conducts when switch 182 is on and rectifier 184 that conducts when switch 186 is on, switches 182 and 186 being switched on mutually exclusively. In this embodiment, the timing signal for driving the rectifiers is derived by using a center-tapped auxiliary winding 188 closely coupled to primary winding 187 of transformer 186. The timing of the drive signal for controlling rectifier 180 is essentially identical to the drive timing employed in the forward converter of FIG. 3. The case of rectifier 184, however, is different. Specifically, since there is a substantial amount of magnetizing current charging the snubbing capacitance 183 (e.g., providing zero-voltage switching (ZVS)), the delay is no longer constant, and a different timing strategy must be used. Since in this case, turning on switch 186 forces a voltage that commutates the current in the rectifiers, a timing arrangement similar to the one used to turn off rectifier 180 may be used.

Figure 17:
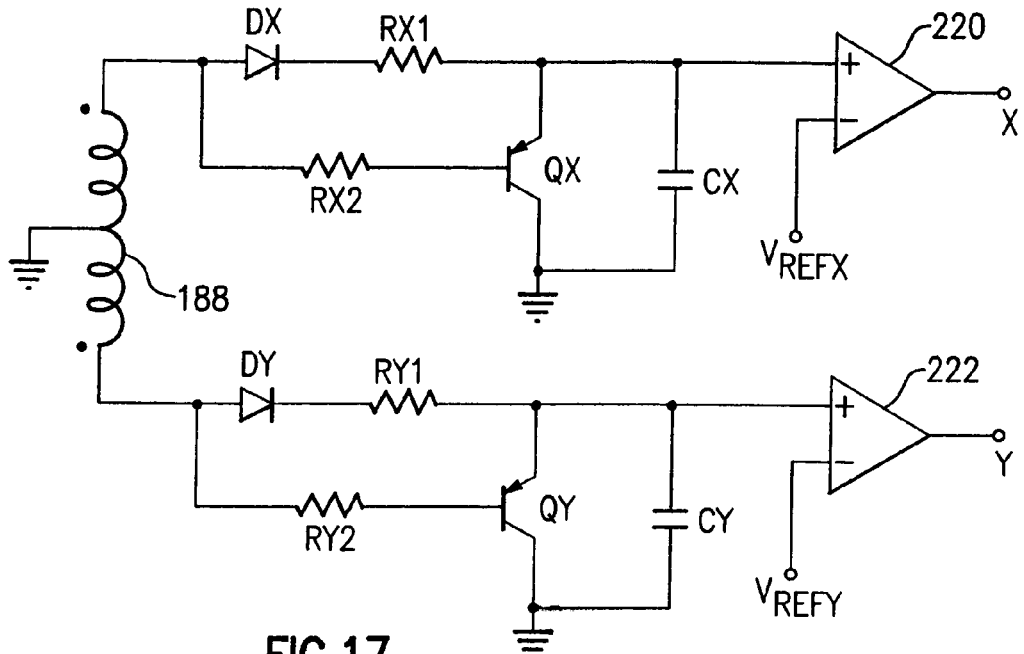
FIG. 17 shows an illustrative timing circuit for controlling synchronous rectification in a Polikarpov-type converter, in accordance with an embodiment of the present invention.

FIG. 17 illustrates an embodiment of a timing circuit for switching rectifiers 180 and 184 of the Polikarpov type converter of FIG. 16 in response to a signal representative of the voltage across primary winding 187 as sensed by winding 188. As shown, the timing circuit includes two similar circuit sections for respectively driving inputs X and Y of rectifiers 180 and 184, the circuit sections comprising diodes $D_X$ and $D_Y$, transistors $Q_X$ and $Q_Y$, base resistors $R_{X2}$ and $R_{Y2}$, resistors $R_{X1}$ and $R_{Y1}$, capacitors $C_X$ and $C_Y$, and comparators 220 and 222. A variable reference signal $V_{refX}$ proportional to the secondary current $I_{secY}$ that flows through the secondary winding at the turn on of switch 182 is input to the non-inverting input of comparator 220, whereas a variable reference signal $V_{refY}$ proportional to the secondary current $I_{secX}$ that flows through the secondary winding at the turn on of switch 186 is input to the non-inverting input of comparator 222. Each of these variable reference signals is also advantageously inversely proportional to the discharge related voltage (e.g., the input voltage). As described for the circuit of FIG. 5, these variable reference signals provide for the variable delay times to turnoff rectifiers 180 and 184, but do not substantially affect the rapid turn-on of the rectifiers. The approach for timing control embodied in FIG. 17 works well for Polikarpov type clamped converters (or Lambda's PH circuit), though it requres a center tapped sense winding 188 to sense the voltage.

As may be appreciated, for each of the synchronous rectifiers driven in accordance with the present invention in the foregoing illustrative embodiments, both turn-on and turn-off are driven in response to the timing signal representative of the primary winding voltage (or primary switch voltage). As noted above, implementations of the present invention need not drive all switching transitions of all synchronous rectifiers in response to a signal representative of the primary winding voltage. Various embodiments above do show driving only the freewheel rectifier (i.e., and not the forward rectifier) in this manner.

In certain applications, however, driving both turn-on and turn-off of a synchronous rectifier based on a signal coupled to the primary may adversely affect circuit operation. For example, if such a drive signal is derived by capacitive coupling to the primary side, a transient voltage appearing between the primary and secondary sides of the converter may cause unintentional switching transitions that can severely degrade performance and may be catastrophic. More specifically, if capacitive coupling to the primary were used to provide the turn-on drive, then a primary side transient event (coupled over the turn-on drive path) that unintentionally turned on the synchronous rectifier at a time when it should be in an off state may cause a disruptive short circuit across the transformer. In accordance with another feature and embodiment of the present invention, this disruption is avoided by not coupling a timing signal from the primary side to control turn-on; only turn-off is driven based on a signal coupled to the primary. It is appreciated that since the primary winding voltage is only coupled to the rectifiers for controlling turn-off, a transient event that unintentionally signal turnoff of the synchronous rectifier will not cause any shorting, or other potentially severe event. More specifically, if a transient event on the primary side were coupled via the turn-off drive path at a time when the synchronous rectifier should be on, then this transient event may cause the synchronous rectifier to unintentionally turn-off. Since, however, the rectifier's body diode could carry the current that passed through the rectifier switch (e.g., through the MOSFET channel), this unintentional turn off will have no significant adverse effect on converter operation.

Figure 18:
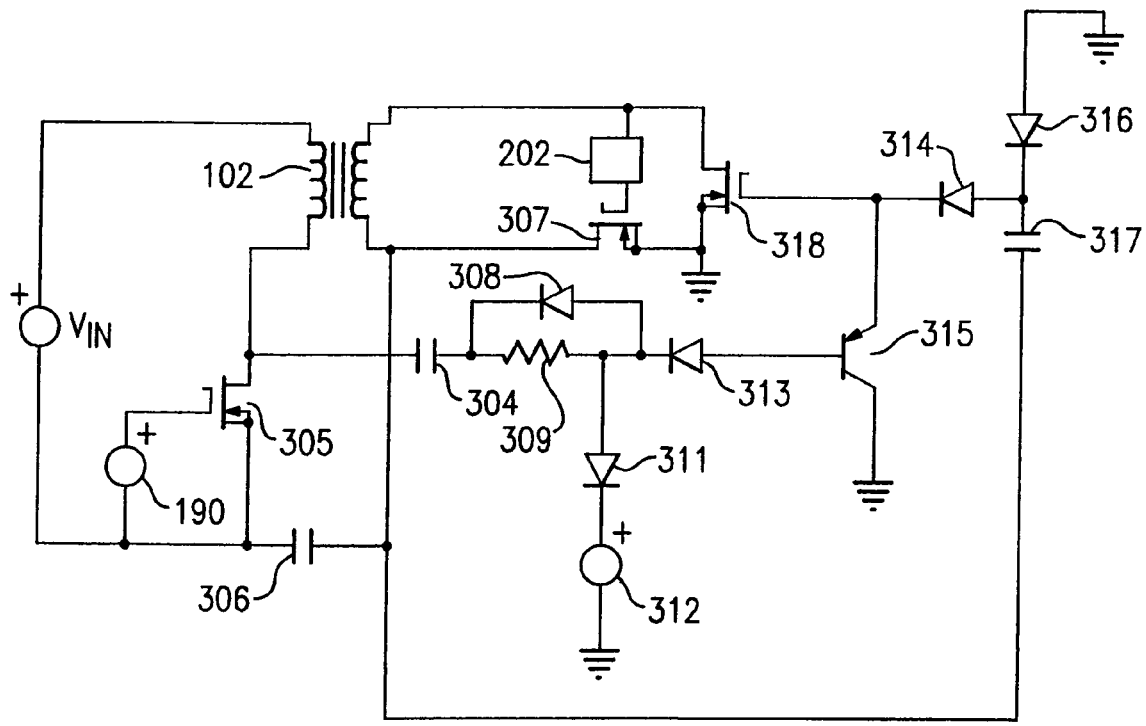
FIG. 18 illustrates a converter in which the turn-off of a synchronous rectifier is driven in response to a timing signal representative of the primary winding voltage, and the turn-on of the synchronous rectifier is driven in response to a signal derived from the secondary winding, which as used herein, is not a signal representative of the primary winding voltage, in accordance with an embodiment of the present invention.

An illustrative embodiment is shown in FIG. 18, wherein only the turn-off of synchronous rectifier 318 is driven in response to a timing signal representative of the primary winding voltage (as this terminology is used herein; e.g., a timing signal coupled to the primary side); turn-on of synchronous rectifier 318 is in response to the secondary winding voltage. Freewheel synchronous rectifier 318 is capacitively charged during the positive transition at the drain of forward rectifier 307 via capacitor 317 and diode 314; diode 316 provides a discharge path for capacitor 317.

Due to the presence of diode 314, transistor 318 will stay on even if the voltage at the drain of transistor 307 drops to zero. Transistor (freewheel rectifier) 318 will turn off when a negative transition would take place at the drain of primary transistor 305. When transistor 305 turns off, its drain voltage goes positive and capacitor 304 is charged via resistor 309. Diode 313 protects the base-emitter junction of transistor 315 against excessive voltage. Diode 311 clamps the voltage that develops at the cathode of diode 313 to a safe value determined by the voltage source 312. When transistor 305 turns on, capacitor 304 will turn on transistor 315 via diodes 308 and 313, thereby turning of the freewheel rectifier 318. It is noted that capacitor 306 represents the common mode capacitors of the EMI filtering typically present in a practical converter. The circuit shown here is just one possible embodiment, and those skilled in the art will recognize that the principle of turning the freewheel rectifier on by a signal available in the secondary of the converter and turning it off by a signal capacitively coupled from the primary of the converter can be implemented by a multitude of other circuits using a variety of devices. It is also understood that the circuit presented here can be enhanced by using the mechanisms that would generate the optimal delay at the turn off, as explained herein.

As may be appreciated, alternative embodiments may trigger only turn-on in response to a signal representative of the primary switch voltage (e.g., primary winding voltage), with the triggering signal for turnoff of the given rectifier being derived independently of a voltage representative of the primary winding voltage or primary switch voltage (e.g., from a secondary winding). As described, however, in various applications implementing only turnoff may be advantageous, particularly where capacitive coupling of a primary side voltage is used to provide the timing signal for driving the synchronous rectifier. Another advantage of such a configuration in which only turn-off drive is generated in response to a primary side voltage signal is that, in certain applications such as described hereinabove for various embodiments of the present invention, the timing of rectifier turn-off is generally more critical than its turn-on timing. Using this timing signal for at least turn-off of a freewheel (or flywheel) rectifier is also advantageous because it negates any limitation to clamped topologies.

In accordance with the foregoing description of illustrative embodiments of the present invention, and illustrative variations or modifications thereof, it may be appreciated that the present invention provides many features, advantages and attendant advantages, including the following illustrative features and advantages. For example, because it is sensitive to and indicative of the beginning of the commutation intervals, a timing signal for synchronous rectification generated according to the present invention allows for optimum timing of synchronous rectifier turn-off to reduce or eliminate reverse recovery effects, as well as cross-conduction and short circuit conditions. Additionally, since the present invention provides a timing signal that is representative of the primary winding or switch voltage to trigger turn-on and/or turn-off of a synchronous rectifier coupled to the secondary transformer winding, the switching control is, a fortiori, not dependent only on a voltage developed across the secondary transformer winding, and thus the present invention is not limited to clamped topologies, but may be implemented in myriad topologies. Simply stated, synchronous rectifier control according to the present invention may be implemented in converter topologies regardless of whether active clamping is used; notably, the self driven circuits of the art described in the background section hereinabove will drive the freewheel rectifier correctly only if active clamping is available. It is also appreciated, that the general applicability of synchronous rectifier control according to the present invention applies not only to generating a timing signal, but also to generating a drive signal having a turn-off delay approximately equal to the applicable commutation intervals.

Another feature that may be associated with the present invention relates to modulating the drive signal amplitude as a function of the load (output) current, which not only advantageously avoids cross conduction at light loads, but also eliminates the possibility of current reversal in the synchronous rectifiers, thus allowing direct parallel operation of synchronously rectified converters and eliminating the inherent positive feedback and the possibility of sustained oscillations which occurs when converters using self driven synchronous rectifiers are connected in parallel.

Those skilled in the art will also understand that while synchronous rectifier control according to the present invention has been described for various isolated forward, flyback, and double-ended topologies, advantageously, it may be implemented in not only other isolated topologies, but non-isolated converter topologies (e.g., buck or buck-boost) as well. It is noted that in the case of non-isolated converters, no leakage inductance is present and the commutation period is very short, and thus the drive delays have to be minimized in order to avoid cross conduction. Under these conditions, the modulation of the drive amplitude is particularly beneficial, as it allows the faster turn off of the synchronous rectifiers when the output load of the converter is light. In addition, the amplitude modulation of the drive eliminates the possibility of current reversal in the synchronous rectifiers' channels, thereby allowing direct parallel connection of these converters.

It may also be understood that the present invention may be applied advantageously to another family of rectification circuits known as "current doublers", which family is widely used in conjunction with actively clamped single ended converters. As the drive requirements (in terms of both timing and delays) for the two rectifiers associated with these circuits are essentially identical to the drive requirements of the conventional forward and freewheel rectifiers discussed hereinabove, the circuits and techniques presented herein will apply directly for converters employing current doubling techniques.

Accurate Limitation of Maximum Duty Cycle PWM Controllers

Figure 19:
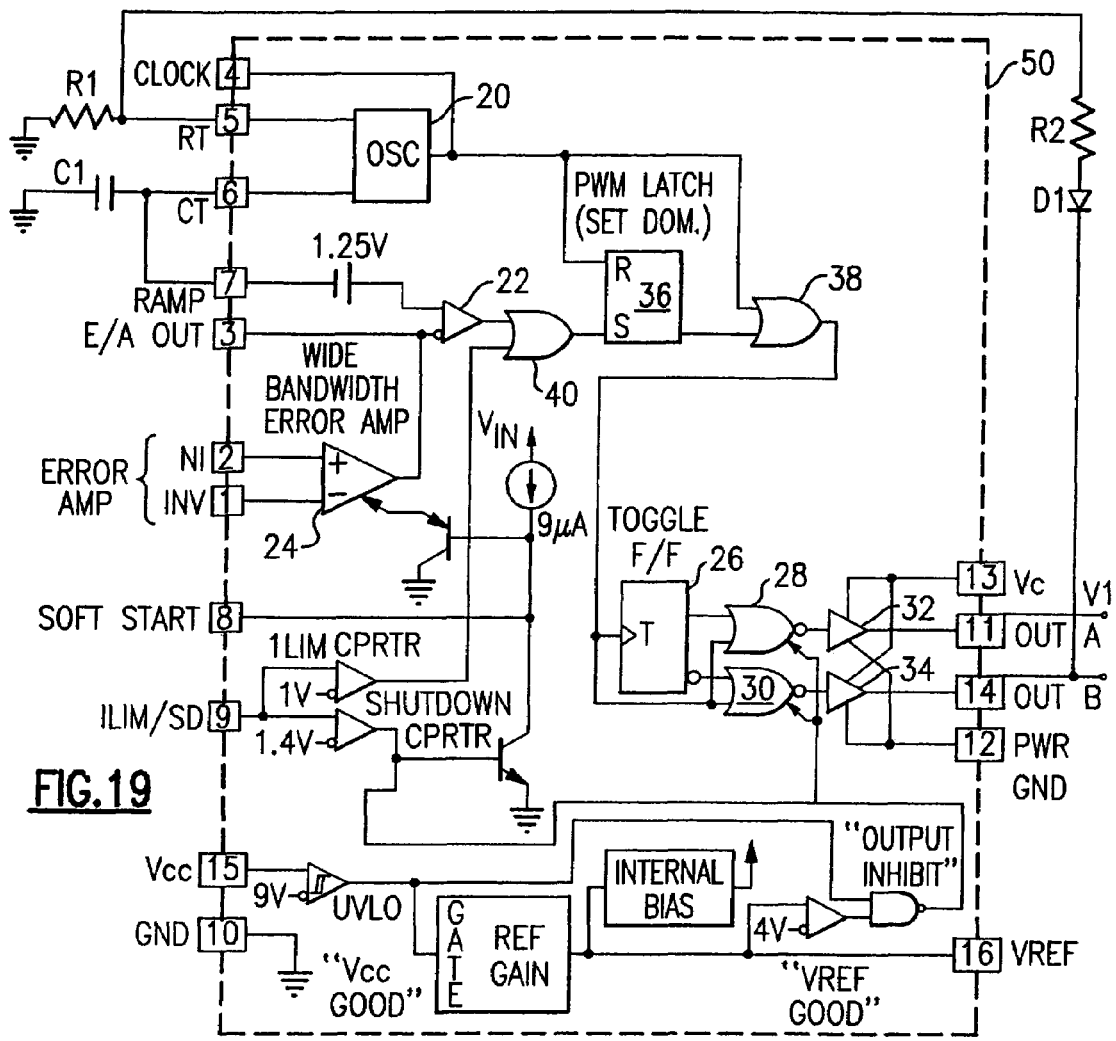
FIG. 19 shows an illustrative embodiment of the present invention implemented with a Unitrode UC3825 High Speed PWM controller IC (integrated circuit) 50.

FIG. 19 shows an illustrative embodiment of the present invention implemented with a Unitrode UC3825 High Speed PWM controller IC (integrated circuit) 50, which is described in Unitrode Corporation's Product Data Sheet/ Application Information for UC1825/UC2825/UC3825 (UC1825 family) High Speed PWM Controller, which is incorporated by reference herein. Such a controller IC 50 is optimized for high frequency switched mode power supply applications. For clarity of exposition, FIG. 19 does not expressly show all connections (e.g., of power supplies, error-amplifier feedback loop elements, etc.) to the controller IC, as such details are not necessary for understanding the present invention and are also well known to ordinarily skilled artisans and may be further understood by reference to the Unitrode data sheets, supra.

As shown, controller IC 20 includes: an oscillator circuit 20, having input pins RT 5 and CT 6 and clock output available at pin 4; a PWM Latch 36; error amplifier (Error Amp) 24, having noninverting and inverting inputs as pin NI 2 and INV 1; a comparator 22, having a Ramp input pin 7; a toggle flip-flop 26; NOR gates 28 and 30; and output drivers 32 and 34. Pin RT 5 is connected to ground via resistor R1, and is connected to the output of driver 34 (i.e., Out B pin 14) via a series connection of resistor R2 and diode D1. A timing capacitor C1 is connected between ground and input pin CT 6 which is connected to Ramp input pin 7 of comparator 22.

Generally, operation of IC50 is as follows. The current that flows out of RT pin 5 charges capacitor C1 that is coupled to pin CT 6 until the voltage on capacitor C1 reaches a predetermined value (e.g., 2.8 V), at which point the capacitor C1 is rapidly (i.e., relative to the charging time) discharged. Accordingly, a sawtooth type voltage wave form is generated at pin 6. As shown, this sawtooth wave form signal is input via ramp input pin 7 to the non-inverting input of comparator 22. The inverting input receives the signal from the output of error amplifier 24. Accordingly, when the ramp input signal to comparator 22 exceeds the error signal provided by error amplifier 24, the output of comparator 22 is high, thus providing a set signal to the S input of PWM latch S, which is operative in providing a short delay when the sawtooth wave form rapidly discharges. The pulse signal that is output by PWM latch 36 is coupled to toggle flip flop 26 and to NOR gates 28 and 30. In accordance with a conventional use of IC 50 to drive a push pull converter, toggle flip flop 26 is operative in ensuring that the output drivers 32 and 34 do not conduct together and that the duty cycle of each drive signal output from drivers 32 and 34 do not exceed 50%. In effect, toggle flip flop 26 provides respective drive signals from drivers 32 and 34 that have a frequency that is half of the oscillator 20.

In accordance with the present invention, as implemented in the embodiment of FIG. 19 where a conventional PWM controller IC is modified, the charging time of the sawtooth generator is modified for alternative successive ramps of the sawtooth voltage waveform. In the embodiment of FIG. 19, such an alternating charging time is provided by alternately modifying the resistance that determines the charging current. As shown, the series connection of resistance R2 and diode D1 is coupled between oscillator charging current pin RT5 and Out B pin 14. Thus, while the signal at Out B pin 14 is high, the charging current is established only by resistance R1, and while the signal at Out B pin 14 is low, the charging current is established by the parallel connection of resistance R1 and resistance R2. Accordingly, the maximum duty cycle is established by the ratio of the charging currents into successive ramps of the sawtooth waveform. For example, if resistances R1 and R2 were equal, then the charging current determined by R1 only will be half the charging current determined by both R1 and R2 in parallel, resulting in a maximum duty cycle of two thirds (i.e., about 67%) (or complementary duty cycle of one third).

Figure 20:
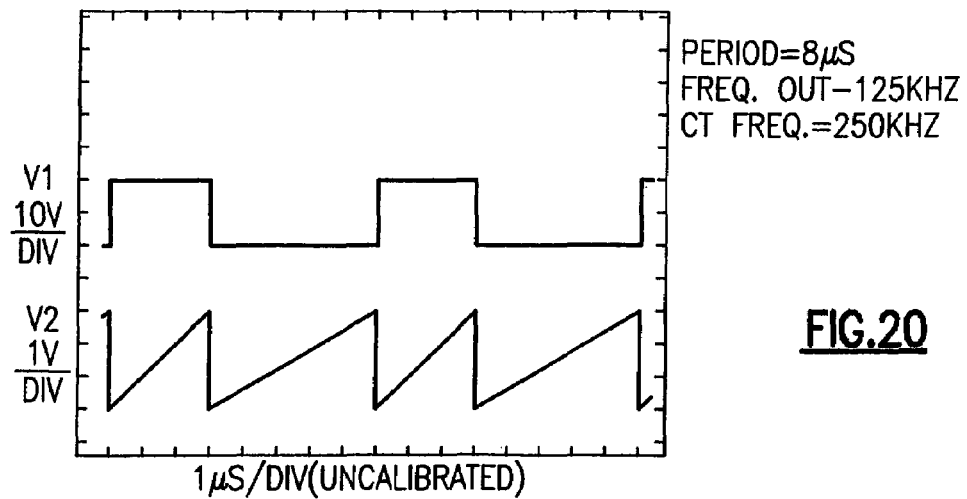
FIG. 20 shows waveforms measured for an experiment conducted in accordance with the embodiment of FIG. 19.

An important feature of the present invention is that the maximum duty cycle is very stable over a wide range of operating temperatures, as it may be appreciated that the duty cycle is established according to the ratio of resistances that control the charging time, and these resistances can have very high tolerance temperature coefficients which are very closely matched. FIG. 20 shows a oscilloscope trace for an experiment performed using the embodiment of FIG. 19, with resistances R1 and R2 both equal to 15.4 kohm and capacitor C1 equal to 490 pf, and with the error amplifier inputs connected to provide the maximum duty cycle at the output. As shown, voltage waveform V2 is a sawtooth having alternating ramp rates. Also, the duty cycle of output signal V1 measured at Out A pin 11 has a duty cycle of approximately 67%, with a period equal to about 8 microseconds. Measurements for the circuit were taken at ambient temperature, 30° C., 50° C. and 70° C. demonstrated very high temperature stability of the duty cycle.

As may be appreciated, the above-described embodiments and examples are merely illustrative of the present invention, which is not limited thereto. For example, it may be appreciated that while in the embodiment of FIG. 19, modifying the resistance modifies the charging time by modifying the current of a current source, alternative embodiments of the present invention may modify the charging time by modifying an RC time constant, as the oscillator may be implemented in various ways. Also, while the above embodiment employs an UC3825, the present invention may be implemented by using myriad such commercially available PWM ICs. It is also understood that although the present invention is well suited for implementation with such commercially available PWM control ICs, it may be practiced in myriad other circuit designs (e.g., discrete circuitry, application specific ICs (ASICs), etc.) which employ impedance controlled charging (e.g., integrator type circuitry) to provide an oscillator waveform that determines the maximum duty cycle. Further, while the above embodiment shows increasing the charging current during a period while the output coupled to the complementary output of the flip flop is low, alternative implementations may decrease the charging current during this interval (state), or similarly may instead increase the charging current during the opposite state. Simply, various implementations of the present invention may modify a resistance in successive intervals (states) to achieve different charging times in different ways (sourcing or sinking current, adding to or shunting some of the charging current, etc.).

Accordingly, although the above description of illustrative embodiments of the present invention, as well as various illustrative modifications and features thereof, provides many specificities, these enabling details should not be construed as limiting the scope of the invention, and it will be readily understood by those persons skilled in the art that the present invention is susceptible to many modifications, adaptations, and equivalent implementations without departing from this scope and without diminishing its attendant advantages. It is therefore intended that the present invention is not limited to the disclosed embodiments but should be defined in accordance with the claims which follow.

I claim:

1. A power converter, comprising:
   a primary switch that repetitively switches between a conductive state and a substantially non-conductive state to selectively connect an input of said power converter to an electrical power source;
   a detection circuit that senses the approximate switch timing of said primary switch to provide a timing signal representative of the primary switch timing; and
   a rectifier device that includes a conduction control terminal and a bi-directional conduction path selectively enabled by said conduction control terminal, such that when said conduction control terminal is driven ON said bi-directional conduction path is activated to conduct an output current provided to an output of said power converter, and when said conduction control terminal is driven OFF said bi-directional conduction path is de-activated, wherein said conduction control terminal is driven OFF based on said timing signal to de-activate said bi-directional conduction path at a time such that the magnitude of the current conducted by said rectifier device is not substantial relative to the magnitude of the output current and such that substantial cross-conduction does not occur.

2. The power converter according to claim 1, wherein said conduction control terminal is driven OFF relative to said timing signal at a delay time when the output current conducted by said bi-directional conduction path to said output reduces to a substantially negligible amount.

3. The power converter according to claim 2, wherein said delay time is a function of the output current.

4. The power converter according to claim 3, wherein said delay time is a function of the voltage of said electrical power source.

5. The power converter according to claim 1, wherein said rectifier is driven ON based on a second timing signal that is independent of any timing signal representative of the switching time of said primary switch.

6. The power converter according to claim 5, wherein said second timing signal, at least during times when said timing signal transitions between levels corresponding to the primary switch switching between the conductive state and the substantially non-conductive state, is not substantially in phase with nor substantially a mirror of the approximate switch timing of said primary switch.

7. The power converter according to claim 1, wherein said rectifier is driven ON based on said timing signal.

8. The power converter according to claim 1, wherein the amplitude of a drive signal applied to said conduction control terminal to drive the rectifier ON is modulated as a function of the output current, such that when the output current decreases below an approximate threshold the drive signal is incapable of driving the rectifier ON in response to said second timing signal, said rectifier thereby being maintained OFF while the output current is below the approximate threshold.

9. The power converter according to claim 1, further comprising a transformer having a primary winding and a secondary winding, wherein said primary winding is connected to said input such that said primary switch selectively couples the primary winding to said electrical power source, said secondary winding selectively conducts the output current, and said rectifier is connected to said secondary winding.

10. The power converter according to claim 9, wherein said detection circuit includes an auxiliary winding of said transformer closely coupled to said primary winding to sense the voltage across said primary winding, said timing signal corresponding to a sense voltage induced in said auxiliary winding.

11. The power converter according to claim 10, further comprising a capacitor that capacitively couples said sense voltage induced in said auxiliary winding to provide a drive signal that drives said conduction control terminal of said rectifier.

12. The power converter according to claim 10, wherein said voltage induced in said auxiliary winding is conductively coupled to said conduction control terminal of said rectifier.

13. The power converter according to claim 12, further comprising a driver having an output that drives said conduction control terminal and an input that is conductively coupled to said auxiliary winding.

14. The power converter according to claim 9, wherein said detection circuit includes a capacitor that is coupled to the voltage across said primary switch to provide said timing signal.

15. The power converter according to claim 14, wherein said primary switch is a MOSFET having a drain terminal, a source terminal, and a gate terminal that is the conduction control terminal, and said capacitor is conductively connected to the drain of said MOSFET.

16. The power converter according to claim 9, wherein said detection circuit includes a capacitor that is coupled to a control terminal of said primary switch to provide said timing signal, said control terminal operative to selectively enable said conductive state and said substantially non-conductive state.

17. The power converter according to claim 16, wherein said primary switch is a MOSFET that is connected in series with said primary winding and has a gate terminal that is said control terminal, and wherein said capacitor is conductively connected to the gate terminal.

18. The power converter according to claim 9, wherein said detection circuit includes a second transformer having a sense winding connected to a control terminal of said primary switch, and a drive winding closely coupled to said sense winding, said timing signal corresponding to the voltage induced in said drive winding based on the voltage waveform on said control terminal, wherein said control terminal is operative to selectively enable said conductive state and said substantially non-conductive state.

19. The power converter according to claim 9, wherein said rectifier conducts the output current when said primary switch is in the substantially non-conductive state, and wherein said rectifier is driven OFF in response to said timing signal transitioning between levels corresponding to the primary switch switching from the substantially non-conductive state to the conductive state.

20. The power converter according to claim 19, wherein said rectifier is driven ON in response to said timing signal transitioning between levels corresponding to the primary switch switching from the conductive state to the substantially non-conductive state.

21. The power converter according to claim 19, wherein said conduction control terminal is driven OFF relative to said timing signal transitioning between levels corresponding to the primary switch switching from the substantially non-conductive state to the conductive state at a delay time when the output current conducted by said bi-directional conduction path to said output reduces to a substantially negligible amount.

22. The power converter according to claim 21, wherein said delay time is a function of the output current.

23. The power converter according to claim 22, wherein said delay time is a function of the voltage of said electrical power source.

24. The power converter according to claim 9, wherein said rectifier conducts the output current when said primary switch is in the conductive state, and wherein said rectifier is driven OFF in response to said timing signal transitioning between levels corresponding to the primary switch switching from the conductive state to the substantially non-conductive state.

25. The power converter according to claim 24, wherein said rectifier is driven ON in response to said timing signal transitioning between levels corresponding to the primary switch switching from the substantially non-conductive state to the conductive state.

26. The power converter according to claim 24, wherein said conduction control terminal is driven OFF relative to said timing signal transitioning between levels corresponding to the primary switch switching from the conductive state to the substantially non-conductive state at a delay time when the output current conducted by said bi-directional conduction path to said output reduces to a substantially negligible amount.

27. The power converter according to claim 26, wherein said delay time is a function of the output current.

28. The power converter according to claim 27, wherein said delay time is a function of the voltage of said electrical power source.

29. The power converter according to claim 9, further comprising a second rectifier connected to said secondary winding.

30. The power converter according to claim 29, wherein said second rectifier is a passive diode that conducts the output current when said primary switch is in the conductive state, wherein said rectifier conducts the output current when said primary switch is in the substantially non-conductive state, said rectifier is driven OFF in response to said timing signal transitioning between levels corresponding to the primary switch switching from the substantially non-conductive state to the conductive state, and wherein the output current commutates between said rectifier and said second rectifier when the primary switch switches between the substantially non-conductive state and the conductive state.

31. The power converter according to claim 29, wherein said second rectifier is an active switch device that conducts the output current when said primary switch is in the conductive state, said rectifier conducts the output current when said primary switch is in the substantially non-conductive state, said second rectifier is driven OFF to selectively de-activate conduction of the output current by the second rectifier in response to said timing signal transitioning between levels corresponding to the primary switch switching from the conductive state to the substantially non-conductive state, and said rectifier is driven OFF in response to said timing signal transitioning between levels corresponding to the primary switch switching from the substantially non-conductive state to the conductive state, and wherein the output current commutates between said rectifier and said second rectifier when the primary switch switches between the substantially non-conductive state and the conductive state.

32. The power converter according to claim 31, wherein said second rectifier is driven ON to selectively activate conduction of the output current by the second rectifier in response to said timing signal transitioning between levels corresponding to the primary switch switching from the substantially non-conductive state to the conductive state, and wherein said rectifier is driven ON in response to said timing signal transitioning between levels corresponding to the primary switch switching from the conductive state to the substantially non-conductive state.

33. The power converter according to claim 32, wherein said conduction control terminal is driven OFF relative to said timing signal transitioning between levels corresponding to the primary switch switching from the substantially non-conductive state to the conductive state at a first delay time when the output current conducted by said bi-directional conduction path to said output reduces to a substantially negligible amount, and wherein said second rectifier is driven OFF relative to said timing signal transitioning between levels corresponding to the primary switch switching from the conductive state to the substantially non-conductive state at a second delay time when the output current conducted by said second rectifier reduces to a substantially negligible amount.

34. The power converter according to claim 33, wherein said first delay is a function of the value of said output current at approximately the instant prior to said primary switch switching from the substantially non-conductive state to the conductive state.

35. The power converter according to claim 34, wherein said second delay is a constant delay.

36. The power converter according to claim 32, wherein said power converter is a forward converter, said second rectifier is a forward rectifier, and said rectifier is a flywheel rectifier.

37. The power converter according to claim 36, wherein said power converter is a resonant reset forward converter.

38. The power converter according to claim 9, wherein the topology of said power converter is selected from the group consisting of forward, flyback, double-ended, and Polykarpov-type.

39. The power converter according to claim 9, wherein said power converter is a resonant reset forward converter and said rectifier is a flywheel rectifier.

40. A system comprising a power converter as recited in claim 1.

41. The system according to claim 40, wherein said system is a power supply.

42. A power converter comprising:
a primary switch that repetitively switches between a conductive state and a substantially non-conductive state to selectively connect an input of said power converter to an electrical power source;
a rectifier that includes a conduction control terminal and a bi-directional conduction path selectively enabled by said conduction control terminal, such that when said conduction control terminal is driven ON said bi-directional conduction path is activated to conduct an output current provided to an output of said power converter, and when said conduction control terminal is driven OFF said bi-directional conduction path is de-activated; and
a drive control circuit that provides a timing signal representative of the approximate switch timing of said primary switch and that, based on said timing signal, drives said conduction control terminal OFF to de-activate said bi-directional conduction path at a time such that the magnitude of the current conducted by said rectifier device is not substantial relative to the magnitude of the output current and such that substantial cross-conduction does not occur.

43. The power converter according to claim 42, wherein said drive control circuit drives said conduction control terminal OFF relative to said timing signal at a delay time when the output current conducted by said bi-directional conduction path to said output reduces to a substantially negligible amount.

44. The power converter according to claim 42, further comprising a driver having an output that drives said conduction control terminal and an input that is coupled to said timing signal.

* * * * *